(12) United States Patent
Takayama

(10) Patent No.: US 11,912,152 B2
(45) Date of Patent: *Feb. 27, 2024

(54) CONTROL DEVICE FOR VEHICLE, VEHICLE, AND CONTROL METHOD OF VEHICLE

(71) Applicant: Toyota Jidosha Kabushiki Kaisha, Aichi-Ken (JP)

(72) Inventor: Daiki Takayama, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 23 days.

This patent is subject to a terminal disclaimer.

(21) Appl. No.: 17/735,730

(22) Filed: May 3, 2022

(65) Prior Publication Data
US 2022/0258641 A1    Aug. 18, 2022

Related U.S. Application Data

(63) Continuation of application No. 16/780,391, filed on Feb. 3, 2020, now Pat. No. 11,351,883.

(30) Foreign Application Priority Data

Feb. 5, 2019   (JP) ................................. 2019-018611

(51) Int. Cl.
*B60L 53/66*    (2019.01)
*B60L 50/64*    (2019.01)
*B60L 53/18*    (2019.01)

(52) U.S. Cl.
CPC ............... *B60L 53/66* (2019.02); *B60L 50/64* (2019.02); *B60L 53/18* (2019.02)

(58) Field of Classification Search
CPC ....................................................... B60L 53/66
(Continued)

(56) References Cited

U.S. PATENT DOCUMENTS 8,504,227 B2 * 8/2013 Ichishi ................... B60L 1/003
                                                            701/29.3
9,669,719 B1 * 6/2017 Gerber .................. H02J 7/0029
(Continued)

FOREIGN PATENT DOCUMENTS

DE    102016219940 A1    4/2018
DE    102017204727 A1    9/2018
(Continued)

OTHER PUBLICATIONS

"Electric vehicle conductive charging system—Part 24: digital communication between a d.c. EV charging station and an electric vehicle for control of d.c. charging", IEC 61851-24: 2014, IEC, p. 1-63, Geneva, Switzerland.
(Continued)

*Primary Examiner* — Jerry D Robbins
(74) *Attorney, Agent, or Firm* — Dinsmore & Shohl LLP

(57) ABSTRACT

In a control device for a vehicle, the vehicle is configured to charge an electric power storage device with an electric power supplied from a charger. The control device includes an input and output circuit and a control circuit. The input and output circuit is configured to input predetermined signal and output the predetermined signal. The control circuit is configured to prepare for charging of the electric power storage device by controlling transmission and reception of signals through the input and output circuit according to a predefined communication sequence. The control circuit is configured to proceed with the predefined communication sequence by transmitting the second signal to the charger even when the vehicle does not receive the first signal at the predetermined timing.

20 Claims, 17 Drawing Sheets

(58) Field of Classification Search
USPC .......................................................... 320/104
See application file for complete search history.

(56) References Cited

U.S. PATENT DOCUMENTS

| | | | |
|---|---|---|---|
| 9,963,042 B2* | 5/2018 | Igarashi | H02J 7/0071 |
| 10,625,614 B2* | 4/2020 | Fremerman | G06Q 10/0631 |
| 2012/0221753 A1 | 8/2012 | Hartwich | |
| 2013/0148746 A1* | 6/2013 | Vedantham | H04B 3/54 |
| | | | 375/257 |
| 2014/0036989 A1* | 2/2014 | Heinrich | H02J 7/00 |
| | | | 320/109 |
| 2016/0039301 A1* | 2/2016 | Igarashi | H02J 7/0071 |
| | | | 320/157 |
| 2018/0037128 A1 | 2/2018 | Gerber et al. | |
| 2018/0370378 A1* | 12/2018 | Konishi | B60L 53/305 |

FOREIGN PATENT DOCUMENTS

| | | |
|---|---|---|
| JP | 2016171613 A | 9/2016 |
| WO | 2018069192 A1 | 4/2018 |

OTHER PUBLICATIONS

"GB/T 27930-2015 communication protocols between off-board conductive charger and battery management system for electric vehicle", Dec. 28, 2015, p. 1-57.

"Surface vehicle standard", SAE Electric Vehicle and Plug in Hybrid Electric Vehicle Conductive Charge Coupler, Oct. 2017, p. 1-116.

* cited by examiner

<CHARGING STOP MESSAGE CST>

<DURING NORMAL RECEPTION>

| MESSAGE | PROCEED WITH SUBSEQUENT SEQUENCE WITHOUT REFERRING TO DATA FIELD | PROCEED WITH SUBSEQUENT SEQUENCE ACCORDING TO DATA FIELD | ACCORDING TO DRAWINGS |
|---|---|---|---|
| CHM | Y | | FIG. 16 |
| CRM | | Y | FIG. 18 |
| CML | | Y | FIG. 19 |
| CRO | | Y | FIG. 18 |
| CCS | Y | | FIG. 16 |
| CST | Y | | FIG. 16 |
| CSD | Y | | FIG. 16 |

CONTROL DEVICE FOR VEHICLE, VEHICLE, AND CONTROL METHOD OF VEHICLE

CROSS-REFERENCE TO RELATED APPLICATIONS

This application is a continuation application of U.S. patent application Ser. No. 16/780,391 filed on Feb. 3, 2020, which claims priority to Japanese Patent Application No. 2019-018611 filed on Feb. 5, 2019, the entire contents of each application is hereby incorporated by reference herein.

BACKGROUND

1. Technical Field

The disclosure relates to a control device for a vehicle, a vehicle, and a control method of a vehicle, and more specifically, a technique of charging an in-vehicle electric power storage device with electric power supplied from a charger provided outside a vehicle.

2. Description of Related Art

Vehicles such as plug-in hybrid vehicles and electric vehicles are commercially available. The vehicles are configured to be capable of "external charging" in which an in-vehicle electric power storage device is charged with electric power supplied from a charger provided outside the vehicle.

In the future, the capacity of the in-vehicle electric power storage device is expected to increase. Accordingly, it is possible to extend an electric vehicle (EV) traveling distance of the vehicle (the distance that the vehicle can travel with the electric power stored in the electric power storage device). On the other hand, when a charging time becomes excessively long with the increased capacity of the electric power storage device, the convenience for the user may be reduced. Therefore, in order to shorten the charging time, external charging with higher electric power (for example, several hundreds of kW) than charging electric power in the related art (for example, several tens of kW) is studied. Hereinafter, such charging is also referred to as "quick charging".

SUMMARY

The quick charging proceeds by the vehicle and the charger executing a series of processes defined in a charging standard in cooperation with each other. In quick charging, various signals are transmitted and received between the vehicle and the charger in accordance with a communication sequence defined in the charging standard prior to the start of charging of an electric power storage device (start of power supply from the charger to the vehicle). By executing the communication sequence, the vehicle and the charger can establish a communication link, determine charging conditions, and mutually confirm success or failure of charging preparation (details thereof will be described later).

In the quick charging, a charging standard different from that in the related art (hereinafter also referred to as "new standard") is employed. For example, in the early stage after the quick charging has started to spread, various types of chargers may be available in the market, but not all the chargers are completely compliant (adapted) to the new standard. It is likely that some chargers do not transmit a signal at the timing defined in the new standard in the communication sequence before the start of power supply from the charger to the vehicle. Specifically, in some chargers, a signal to be transmitted may be missing or a signal may be transmitted in an order different from the original order.

However, even for such a charger, when the electric power supply starts, the electric power may be suppliable in compliance with the new standard. However, the electric power supply cannot be started unless the communication sequence proceeds.

The disclosure provides a control device for a vehicle, a vehicle, and a method of controlling a vehicle, which increase a possibility of charging an electric power storage device even when a charger does not comply with a communication sequence.

A first aspect of the disclosure relates to a control device for a vehicle. The vehicle includes an electric power storage device, and is configured to charge the electric power storage device with an electric power supplied from a charger provided outside the vehicle. The control device includes an input and output circuit and a control circuit. The input and output circuit is configured to input a predetermined signal, and configured to output the predetermined signal. The predetermined signal is a signal transmitted and received between the vehicle and the charger. The control circuit is configured to, prior to starting charging of the electric power storage device, prepare for charging of the electric power storage device by controlling transmission and reception of signals through the input and output circuit according to a predefined communication sequence. The predefined communication sequence is defined that a second signal is transmitted to the charger when the vehicle receives a first signal at a predetermined timing. The control circuit is configured to proceed with the predefined communication sequence by transmitting the second signal to the charger even when the vehicle does not receive the first signal at the predetermined timing.

With the aspect of the disclosure, when the first signal from the charger is not received at a predetermined timing, for example, when the first signal is not received even after the time defined in the communication sequence (that is, the first signal is missing) or even when another signal is received instead of the first signal, the process defined in the communication sequence proceeds by transmitting the second signal from the vehicle to the charger. Accordingly, when the charger appropriately responds to the second signal, the communication sequence can further proceed (details thereof will be described later). Therefore, it is possible to increase the possibility that external charging can be performed when the charger does not comply with the communication sequence defined in a charging standard.

In the control device of the aspect of the disclosure, the first signal may be a signal that establishes a communication link between the vehicle and the charger. The control circuit may be configured to transmit the second signal when the first signal is not received even after a time defined in the predefined communication sequence has elapsed.

In the control device of the aspect of the disclosure, the predefined communication sequence may be further defined such that the vehicle receives a third signal transmitted in response to the second signal from the charger. The control circuit may be configured to further proceed with the predefined communication sequence when the vehicle receives the third signal after the second signal is transmitted. The control circuit may be configured to stop proceeding with the predefined communication sequence when the vehicle does not receive the third signal after the second signal is transmitted.

When the first signal is a signal for establishing a communication link between the vehicle and the charger, it is possible to confirm the establishment of the communication link by another signal even when the first signal is missing. With the above configuration, when the charger properly responds to the second signal even when the first signal from the charger is missing (when the vehicle receives the third signal), it is possible that determine that the communication link is established on the vehicle, and thus it is possible to further proceed with the communication sequence. Therefore, it is possible to increase the possibility that external charging can be performed when the charger does not comply with the communication sequence defined in a charging standard. On the other hand, when the charger does not properly respond to the second signal (when the vehicle does not receive the third signal), determination is made on the vehicle that the communication link is not established, and proceeding with the communication sequence is stopped. This makes it possible to ensure the safety of the electric power exchange between the vehicle and the charger.

In the control device of the aspect of the disclosure, the first signal may be a signal for notification of the electric power suppliable from the charger. The control circuit may be configured to transmit the second signal when the first signal is not received even after a time defined in the predefined communication sequence has elapsed.

In the control device of the aspect of the disclosure, the second signal may be a signal for notification of a preparation state of charging of the vehicle. The control circuit may be configured to further proceed with the predefined communication sequence when the vehicle receives the first signal after the second signal is transmitted. The control circuit may be configured to stop proceeding with the predefined communication sequence when the vehicle does not receive the first signal after the second signal is transmitted.

When the first signal is a signal for notification of the power that can be supplied from the charger, the first signal is needed for safe power exchange. Therefore, with the above configuration, the predefined communication sequence further proceeds when the first signal is received even after the transmission of the second signal. On the other hand, when the first signal is missing, it is possible to ensure the safety of power exchange by stopping proceeding with the communication sequence.

In the control device of the aspect of the disclosure, the first signal may be a signal for notification that a preparation of electric power supply of the charger is not completed. The control circuit may be configured to transmit the second signal when the vehicle receives another signal that does not follow an order defined in the predefined communication sequence, instead of receiving the first signal. The other signal may be a signal for notification that the preparation of electric power supply of the charger is completed.

In the control device of the aspect of the disclosure, the first signal may be a signal for notification that a preparation of electric power supply of the charger is completed. The control circuit may be configured to transmit the second signal when the vehicle receives another signal that does not follow an order defined in the predefined communication sequence, instead of receiving the first signal. The second signal may be a signal for notification of a requested voltage and a requested current of the vehicle, and the other signal may be a signal for notification of a supply voltage and a supply current of the charger. Therefore, it is possible to increase the possibility that external charging can be performed when the charger does not comply with the predefined communication sequence defined in a charging standard.

With the configuration, even when the first signal is missing, by receiving the other signal, it is possible to determine, on the vehicle, that the preparation of the electric power supply of the charger is completed, and to further proceed with the communication sequence. Therefore, it is possible to increase the possibility that external charging can be performed when the charger does not comply with the communication sequence defined in a charging standard.

A second aspect of the disclosure relates to a vehicle. The vehicle includes an electric power storage device configured to charge with an electric power supplied from a charger provided outside the vehicle and a control device configured to include an input and output circuit and a control circuit. The input and output circuit is configured to input a predetermined signal, and configured to output the predetermined signal. The predetermined signal is a signal transmitted and received between the vehicle and the charger. The control circuit is configured to, prior to starting charging of the electric power storage device, prepare for charging of the electric power storage device by controlling transmission and reception of signals through the input and output circuit according to a predefined communication sequence. The predefined communication sequence is defined that the vehicle transmits a second signal to the charger when the vehicle receives a first signal at a predetermined timing. The control circuit is configured to proceed with the predefined communication sequence by transmitting the second signal to the charger even when the vehicle does not receive the first signal at the predetermined timing.

With the aspect of the disclosure, when the first signal from the charger is not received at a predetermined timing, for example, when the first signal is not received even after the time defined in the communication sequence (that is, the first signal is missing) or even when another signal is received instead of the first signal, the process defined in the communication sequence proceeds by transmitting the second signal from the vehicle to the charger. Accordingly, when the charger appropriately responds to the second signal, the communication sequence can further proceed (details thereof will be described later). Therefore, it is possible to increase the possibility that external charging can be performed when the charger does not comply with the communication sequence defined in a charging standard.

A third aspect of the disclosure relates to a method of controlling a vehicle. The vehicle includes an electric power storage device and a control device, and is configured to charge the electric power storage device with an electric power supplied from a charger provided outside the vehicle. The control device is configured to, prior to starting charging of the electric power storage device, prepare for charging of the electric power storage device by controlling transmission and reception of signals to and from the charger according to a predefined communication sequence. The predefined communication sequence is defined that a second signal is transmitted to the charger when the vehicle receives a first signal at a predetermined timing. The method includes determining, by the control device, whether or not the first signal is received at the predetermined timing, and proceeding, by the control device, with the predefined communication sequence by transmitting the second signal to the charger even when the first signal is not received at the predetermined timing.

With the aspect of the disclosure, it is possible to increase the possibility of charging the electric power storage device even when the charger does not comply with the communication sequence.

With the disclosure, it is possible to increase the possibility that external charging can be performed when the charger does not comply with the communication sequence defined in a charging standard.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
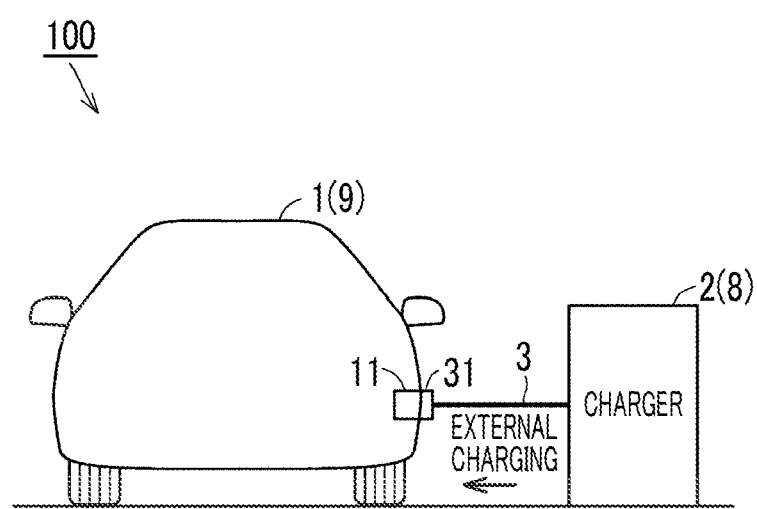
FIG. 1 is a diagram schematically showing an overall configuration of a charging system according to a first embodiment of the disclosure.

Hereinafter, embodiments will be described in detail with reference to drawings. The same reference numerals are assigned to the same or corresponding portions of the drawings and description thereof will not be repeated.

FIG. 1 is a diagram schematically showing the overall configuration of the charging system according to the first embodiment of the disclosure. Referring to FIG. 1, a charging system 100 includes a vehicle 1, a charger 2, and a charging cable 3. FIG. 1 shows a situation when the vehicle 1 and the charger 2 are electrically connected by the charging cable 3 and external charging is performed from the charger 2 to the vehicle 1.

The vehicle 1 is, for example, an electric vehicle. However, the vehicle 1 may be any vehicle configured to be externally chargeable, for example, a plug-in hybrid vehicle. The charger 2 is, for example, a quick charger provided in a public charging stand (also referred to as a charging station).

Figure 2:
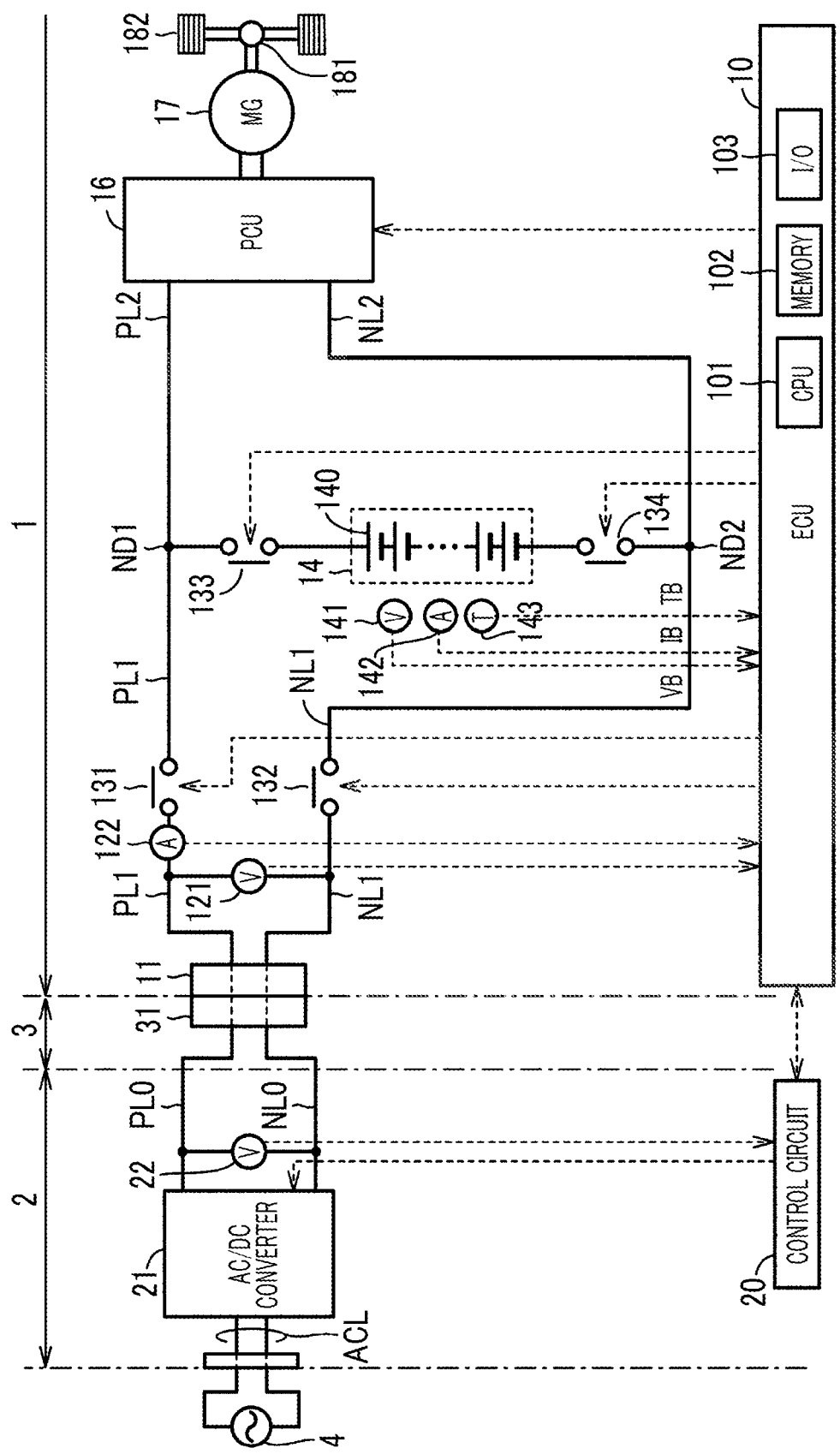
FIG. 2 is a block diagram schematically showing a configuration of a vehicle and a charger.

FIG. 2 is a block diagram schematically showing a configuration of the vehicle 1 and the charger 2. Referring to FIG. 2, the charger 2 is a direct current (DC) charger and converts electric power supplied from a system power supply 4 (alternating current power) into charging electric power (DC power) of a battery 14 mounted on vehicle 1. The charger 2 includes an electric power line ACL, an AC/DC converter 21, a voltage sensor 22, electric power supply lines PL0 and NL0, and a control circuit 20.

The electric power line ACL is electrically connected to the system power supply 4. The electric power line ACL transmits the AC power from the system power supply 4 to the AC/DC converter 21.

The AC/DC converter 21 converts the AC power on the electric power line ACL into the DC power for charging the battery 14 mounted on the vehicle 1. The electric power conversion by the AC/DC converter 21 may be executed by a combination of AC/DC conversion for power factor improvement and DC/DC conversion for voltage level adjustment. The DC power output from the AC/DC converter 21 is supplied by the electric power supply line PL0 on a positive electrode side and the electric power supply line NL0 on a negative electrode side.

Voltage sensor 22 is electrically connected between the electric power supply line PL0 and the electric power supply line NL0. The voltage sensor 22 detects a voltage between the electric power supply line PL0 and the electric power supply line NL0 and outputs the detection result to the control circuit 20.

The control circuit 20 includes a central processing unit (CPU), a memory, and an input and output port (all not shown). The control circuit 20 controls an electric power conversion operation by the AC/DC converter 21 based on the voltage detected by the voltage sensor 22, a signal from the vehicle 1, and a map and a program stored in the memory.

The vehicle 1 includes an inlet 11, charging lines PL1, NL1, a voltage sensor 121, a current sensor 122, charging relays 131 and 132, system main relays (SMR) 133, 134, the battery 14, electric power lines PL2, NL2, a power control unit (PCU) 16, a motor generator 17, a power transmission gear 181, drive wheels 182, and an electronic control unit (ECU) 10.

The inlet (charging port) 11 is configured such that a connector 31 of the charging cable 3 can be inserted with mechanical connection such as fitting. As the insertion of the connector 31 is inserted, an electrical connection between the electric power supply line PL0 and a contact point on a positive electrode side of the inlet 11 is ensured, and an electrical connection between the electric power supply line NL0 and a contact point on a negative electrode side of the inlet 11 is ensured. Further, with the connection of the inlet 11 and the connector 31 connected by the charging cable 3, the ECU 10 of the vehicle 1 and the control circuit 20 of the charger 2 communicate with each other according to a communication standard such as a controller area network (CAN) or by analog signals via an analog control line, and thus various pieces of information such as a signal, a command, and a message or data can be transmitted and received to and from each other.

The voltage sensor 121 is electrically connected between the charging line PL1 and the charging line NL1 on the inlet 11 side rather than the charging relays 131 and 132. The voltage sensor 121 detects a DC voltage between the charging line PL1 and the charging line NL1 and outputs the detection result to the ECU 10. The current sensor 122 is provided on the charging line PL1. The current sensor 122 detects a current flowing through the charging line PL1 and outputs the detection result to the ECU 10. The ECU 10 can also calculate the electric power supplied from the charger 2 (charging amount of the battery 14) based on the detection results of the voltage sensor 121 and the current sensor 122.

The charging relay 131 is connected to the charging line PL1, and the charging relay 132 is connected to the charging line NL1. The closing and opening of the charging relays 131, 132 are controlled in response to a command from the ECU 10. When the charging relays 131, 132 are closed and the SMR 133 and the SMR 134 are closed, the electric power can be transmitted between the inlet 11 and the battery 14.

The battery 14 supplies electric power for generating the driving force of the vehicle 1. Further, the battery 14 stores electric power generated by the motor generator 17. The battery 14 is an assembled battery including a plurality of cells 140. Each cell 140 is a secondary battery such as a lithium-ion secondary battery or a nickel-metal hydride battery. The battery 14 is an example of an "electric power storage device" according to the disclosure. Instead of the battery 14, a capacitor such as an electric double-layer capacitor may be used.

The positive electrode of the battery 14 is electrically connected to a node ND1 through the SMR 133. The node ND1 is electrically connected to the charging power line PL1 and the electric power line PL2. Similarly, the negative electrode of the battery 14 is electrically connected to the node ND2 through the SMR 134. The node ND2 is electrically connected to the charging power line NL1 and the electric power line NL2. The closing and opening of the SMRs 133 and 134 are controlled in response to a command from the ECU 10.

The battery 14 is provided with a voltage sensor 141, a current sensor 142, and a battery temperature sensor 143. The voltage sensor 141 detects a voltage VB of the battery 14. The current sensor 142 detects a current IB to be input and output to and from the battery 14. The battery temperature sensor 143 detects a temperature TB of the battery 14. Each sensor outputs the detection result to the ECU 10. The ECU 10 can calculate a state of charge (SOC) of the battery 14 based on the detection result by at least one of the voltage sensor 141 or the current sensor 142.

The PCU 16 is electrically connected between the electric power lines PL2, NL2, and the motor generator 17. The PCU 16 includes a converter and an inverter (both not shown) and drives the motor generator 17 in response to a command from the ECU 10.

The motor generator 17 is an AC rotating electric machine, for example, a permanent magnet type synchronous motor including a rotor in which a permanent magnet is embedded. The output torque of the motor generator 17 is transmitted to the drive wheels 182 through the power transmission gear 181 and causes the vehicle 1 to travel. Further, the motor generator 17 can generate electric power by rotational force of the drive wheels 182 during a braking operation of the vehicle 1. The electric power generated by the motor generator 17 is converted by the PCU 16 into charging electric power for the battery 14.

Similar to the control circuit 20, the ECU 10 includes a CPU 101, a memory 102 such as a read only memory (ROM) and a random access memory (RAM), and an input and output port 103. The ECU 10 controls apparatuses such that vehicle 1 is in a desired state in response to a signal from each sensor or the like. The ECU 10 may be divided into a plurality of ECUs for each function. The CPU 101 is an example of a "control circuit" according to the present disclosure, and the input and output port 103 is an example of an "input and output circuit" according to the present disclosure.

An example of a main control executed by the ECU 10 is an external charging control that charges the in-vehicle battery 14 with the electric power supplied from the charger 2. The external charging control proceeds by mutually transmitting and receiving various messages between the ECU 10 of the vehicle 1 and the control circuit 20 of the charger 2 through the charging cable 3. Hereinafter, the transmission and reception of the messages will be described in detail.

In the external charging control, a communication sequence relating to a message exchange between the vehicle 1 and the charger 2 proceeds, and a charging sequence relating to an electric power exchange between the vehicle 1 and the charger 2 proceeds. Both the communication sequence and the charging sequence are defined in a charging standard (new standard) of quick charging. An example of the communication sequence will be schematically described below.

Figure 3:
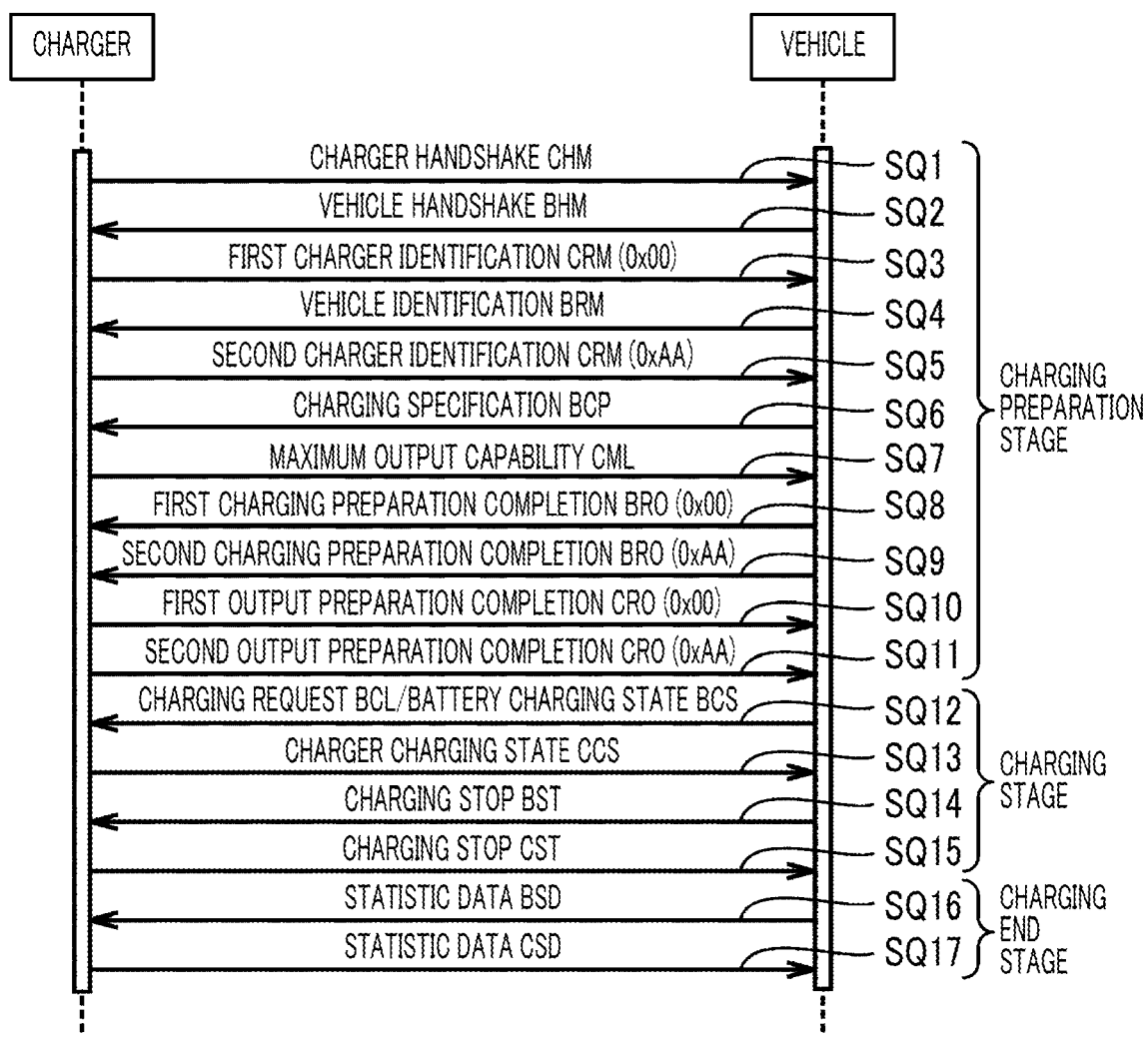
FIG. 3 is a communication sequence diagram of an external charging control defined in a charging standard.

FIG. 3 is a sequence diagram showing an example of the communication sequence of the external charging control. In FIG. 3 and FIGS. 4 to 11 to be described below, a sequence process executed by the control circuit 20 of the charger 2 is shown on the left in the diagram, and a sequence process executed by the ECU 10 of the vehicle 1 is shown on the right in the diagram. In the following, for the sake of simplicity, an execution subject of the process executed by the ECU 10 may be described as the vehicle 1, and an execution subject of the process executed by the control circuit 20 may be described as the charger 2.

Referring to FIG. 3, this communication sequence is started when the vehicle 1 and the charger 2 are physically connected by the charging cable 3 and further low-voltage power supply for realizing the communication such as the CAN between the vehicle 1 and the charger 2 is supplied.

The communication sequence shown in FIG. 3 may be referred to as a "standard communication sequence".

The processes included in the standard communication sequence are classified into a charging preparation stage (a charging handshake stage and a charging parameter disposition stage), a charging stage, and a charging end stage. In the charging preparation stage, establishment of a communication link between the vehicle 1 and the charger 2, deciding of a charging condition, confirmation of success or failure of the charging preparation, and the like are performed. In the charging stage, actual electric power is supplied from the charger 2 to the vehicle 1 according to the charging sequence (not shown). At the charging end stage, statistical data relating to the current charging is exchanged between the vehicle 1 and the charger 2 after the electric power supply.

First, a handshake between the vehicle 1 and the charger 2 is performed in the charging preparation stage. Specifically, the charger 2 transmits a charger handshake message CHM to the vehicle 1 (SQ1). The charger handshake message CHM may include information relating to a version number of the communication sequence (communication protocol) with which the charger 2 complies. The vehicle 1 transmits a vehicle handshake message BHM to the charger 2 in response to the charger handshake message CHM (SQ2). The vehicle handshake message BHM may include information relating to a maximum allowable voltage of the vehicle 1.

Further, the process for establishing the communication link between the vehicle 1 and the charger 2 is executed. Specifically, the charger 2 transmits a first charger identification message CRM (0x00) indicating that the charger 2 does not yet identify the vehicle 1 to the vehicle 1 (SQ3). The vehicle 1 transmits a vehicle identification message BRM for the charger 2 to identify the vehicle 1 to the charger 2 in response to the first charger identification message CRM (0x00) (SQ4). The vehicle identification message BRM may include information relating to the version number of the communication sequence with which the vehicle 1 complies, the type of the battery 14 (such as lithium-ion secondary battery or nickel-metal hydride battery), and a rating capacity and a rating voltage of the vehicle 1. The charger 2 transmits a second charger identification message CRM (0xAA) indicating that the charger 2 identifies the vehicle 1 to the vehicle 1 in response to the vehicle identification message BRM (SQ5).

Next, the vehicle 1 transmits a charging specification message BCP relating to specifications of the battery 14 mounted on the vehicle 1 to the charger 2 (SQ6). The charging specification message BCP may include information relating to maximum allowable voltages of the battery 14 and the cell 140, a maximum allowable current of the battery 14, a maximum allowable temperature, the SOC and the voltage VB, and the like. The charger 2 transmits a maximum output capability message CML for calculating maximum electric power that can be output from the charger 2 to the vehicle 1 in response to the charging specification message BCP (SQ7). The maximum output capability message CML may include information relating to a minimum output voltage and a minimum output current in addition to a maximum output voltage and a maximum output current.

Subsequently, the vehicle 1 transmits a first charging preparation completion message BRO (0x00) indicating that the charging preparation for the vehicle 1 is not yet completed to the charger 2 (SQ8). Further, the vehicle 1 transmits a second charging preparation completion message BRO (0xAA) indicating that the charging preparation for the vehicle 1 is completed to the charger 2 (SQ9). The charger 2 transmits a first output preparation completion message CRO (0x00) indicating that the output (electric power supply) preparation from the charger 2 is not yet been completed to the vehicle 1 in response to the second charging preparation completion message BRO (0xAA) (SQ10). Further, the charger 2 transmits a second output preparation completion message CRO (0xAA) indicating that the output preparation from the charger 2 is completed to the vehicle 1 (SQ11). Accordingly, the charging preparation stage ends, and the process proceeds to the charging stage.

In the charging stage, the vehicle 1 transmits a charging request message BCL to the charger 2 and transmits a battery charging state message BCS to the charger 2 (SQ12). The charging request message BCL may include information relating to a requested voltage and a requested current from the vehicle 1 to the charger 2 and a charging mode (a constant voltage charging mode or a constant current charging mode). The battery charging state message BCS may include information relating to the charging voltage VB, the charging current IB, and SOC of the battery 14, an estimated value of remaining charging time, and the like. On the other hand, the charger 2 transmits a charger charging state message CCS for performing notification of a charging start (continuation) to the vehicle 1 (SQ13). The charger charging state message CCS may include information relating to an output voltage (supply voltage) and an output current (supply current) of the charger 2.

Thereafter, the vehicle 1 transmits a charging stop message BST indicating that the vehicle 1 stops the charging to the charger 2 (SQ14). The charging stop message BST may include information relating to a cause of the charging stop by the vehicle 1 or the like. The charger 2 transmits a charging stop message CST indicating that the charger 2 stops the charging to the vehicle 1 (SQ15). Information relating to a cause of the charging stop by the charger 2 or the like may be included. Accordingly, the charging stage ends, and the process proceeds to the charging end stage.

In the charging end stage, the vehicle 1 transmits a statistical data message BSD indicating statistical data of the vehicle 1 in the current charging process to the charger 2 (SQ16). The statistical data message BSD may include information relating to the SOC of the battery 14 at the time of the charging stop, and a minimum voltage, maximum voltage, minimum temperature, and maximum temperature of the battery 14. On the other hand, the charger 2 transmits a statistical data message CSD indicating statistical data of the charger 2 in the current charging process to the vehicle 1 (SQ17). The statistical data message CSD may include information relating to a charging time of the current charging and amount of output electric power from the charger 2 in the current charging. Accordingly, a series of communication sequences between the vehicle 1 and the charger 2 ends.

As described above, the standard communication sequence defined in the charging standard proceeds in order of the charging preparation stage, the charging stage, and the charging end stage while basically the messages (signals) are exchanged alternately between the vehicle 1 and the charger 2. In the following, in order to facilitate understanding of the characteristics of the communication sequence in the embodiment, a communication sequence in a comparative example (particularly a sequence in the charge preparation stage) will be described.

In the comparative example, external charging of the vehicle 9 is performed instead of the vehicle 1. The entire configuration of the vehicle 9 are the same as that of the vehicle 1 shown in FIGS. 1 and 2. The vehicle 9 can execute a process compliant to the quick charging standard (new standard), but it is assumed that the charger is not completely compliant to the standard. In contrast to the charger 2 that comply with the new standard, a charger that does not completely comply with the new standard is denoted as "charger 8" to distinguish the chargers from each other.

Figure 4:
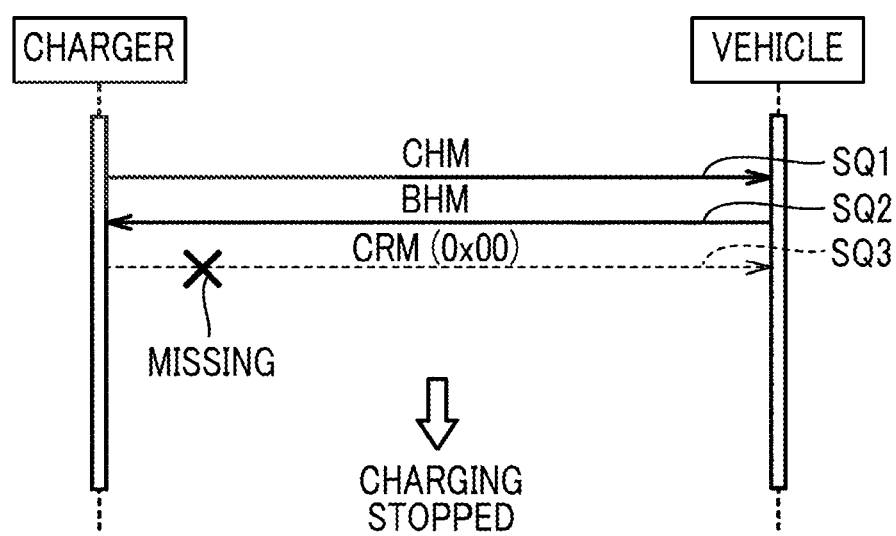
FIG. 4 is a sequence diagram showing a communication sequence of an external charging control in a comparative example.

FIG. 4 is a sequence diagram showing a communication sequence of an external charging control in a comparative example. Referring to FIG. 4, in the comparative example, first, the charger 8 normally transmits a charger handshake message CHM to the vehicle 9 as described in FIG. 3 (SQ1). The vehicle 9 transmits a vehicle handshake message BHM to the charger 8 in response to the charger handshake message CHM (SQ2).

When the charger complies with the communication sequence of the new standard, a first charger identification message CRM (0x00) is transmitted, and when the charger 8 does not comply with the new standard, the first charger identification message CRM (0x00) is not transmitted (see dotted line). In order words, in the comparative example shown in FIG. 4, the first charger identification message CRM (0x00) from the charger 8 is missing. Therefore, the vehicle identification message BRM as a response to the first charger identification message CRM (0x00) is not transmitted from the vehicle 9 to the charger 8. As a result, the communication sequence is interrupted in the charging preparation stage. When the defined time has elapsed with the communication sequence being interrupted, it is assumed that the communication link between the vehicle 9 and the charger 8 fails to be established, and the external charging control ends without supplying power from the charger 8 to the vehicle.

As described above, when the charger 8 as shown in FIG. 4 is encountered, the vehicle 9 cannot be externally charged even though the vehicle 9 complies with the new standard. In this situation, the user of the vehicle 9 is likely to have time and labor to search for another charger, and so the convenience for the user may be reduced.

However, even for the charger 8, when the electric power supply from the charger 8 to the vehicle 9 starts, the charger 8 may be capable of supplying the electric power in compliance with the new standard. Considering the possibility described above, the vehicle 1 according to the embodiment employs a configuration of proceeding forward with the process defined in the standard communication sequence, for example, even when the first charger identification message CRM (0x00) from the charger 8 is missing and the first charger identification message CRM (0x00) is not received at the timing defined in the new standard.

Figure 5:
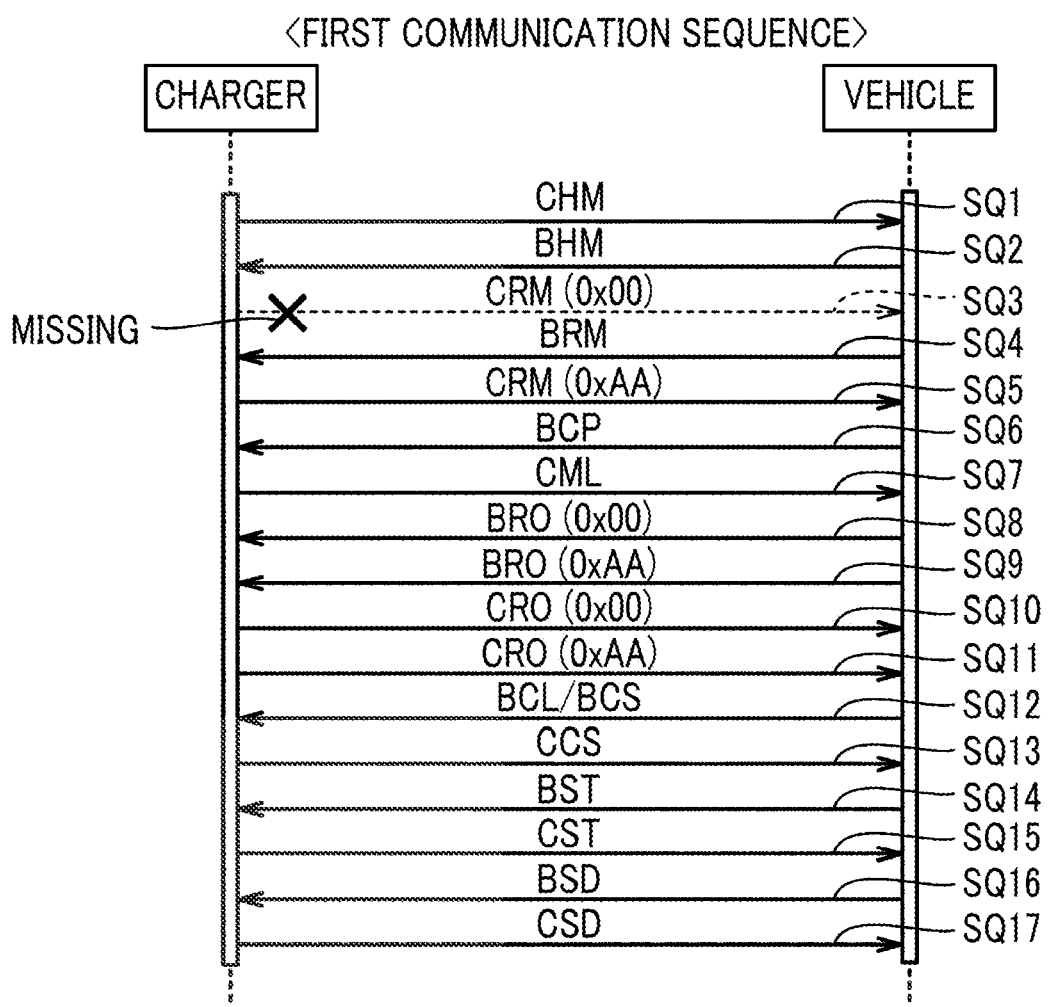
FIG. 5 is a flowchart showing the communication sequence of the external charging control in the first embodiment.

FIG. 5 is a sequence diagram showing a first communication sequence of the external charging control in the first embodiment. Referring to FIG. 5, even when the vehicle 1 does not receive the first charger identification message CRM (0x00) from the charger 8, the vehicle 1 transmits a vehicle identification message BRM to the charger 8 (SQ2) at the time when a defined time has elapsed from the time when the vehicle handshake message BHM is transmitted (SQ4) (the time when a temporary timeout to be described later is established). Then, when the charger 8 transmits a second charger identification message CRM (0xAA) in response to the vehicle identification message BRM (SQ5), the vehicle 1 transmits a charging specification message BCP to the charger 8 in response to the second charger identification message CRM (0xAA) (SQ6). Then, similarly to the description in the standard communication sequence (see FIG. 3) to be described later, processes after SQ7 proceeds.

As described above, the first charger identification message CRM (0x00) and the second charger identification message CRM (0xAA) are signals used for establishing a communication link between the vehicle 1 and the charger 8. For example, when the first charger identification message CRM (0x00) is not received in SQ3 and the second charger identification message CRM (0xAA) is received in SQ5, the vehicle 1 can determine that the communication link is established. In this way, the vehicle 1 proceeds to the transmission of the charging specification message BCP (SQ6). Then, the charger 8 complies with the new standard, and SQ7 to SQ11 are normally executed, the battery 14 can be charged by proceeding to the charging stage.

The sequence diagram described in FIG. 5 is merely one example, and the same process can be executed even when other messages from the charger 8 is not missed as described below in FIGS. 6 and 7.

Figure 6:
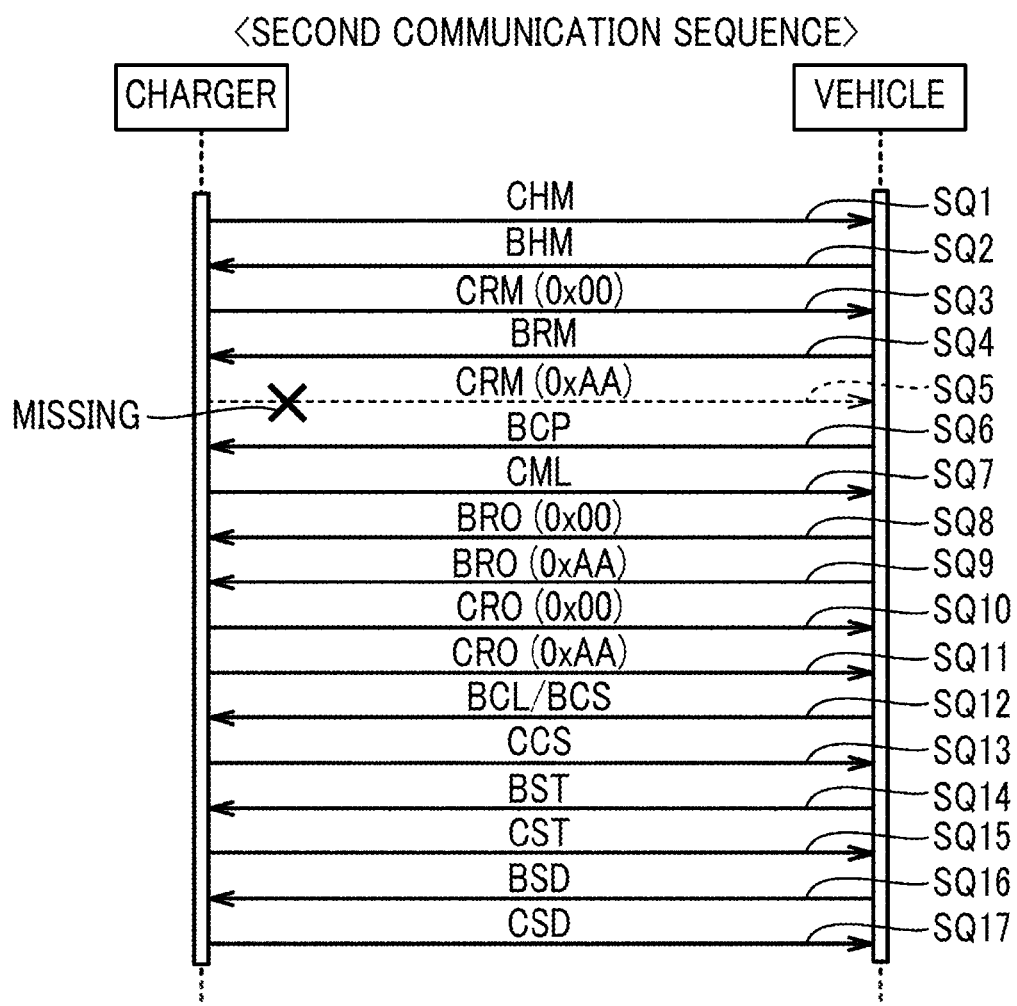
FIG. 6 is a sequence diagram showing a second communication sequence of the external charging control in the first embodiment.

FIG. 6 is a sequence diagram showing a second communication sequence of the external charging control in the first embodiment. Referring to FIG. 6, processes of SQ1 to SQ4 in the second communication sequence are the same as corresponding processes in the standard communication sequence (see FIG. 3).

In the second communication sequence, the second charger identification message CRM (0xAA) from the charger 8 is missing. Even when the vehicle 1 does not receive the second charger identification message CRM (0xAA) from the charger 8, the vehicle 1 transmits the charging specification message BCP to the charger 8 (SQ6) at the time when a defined time has elapsed from the time when the vehicle identification message BRM is transmitted (SQ4).

When the charger 8 transmits a maximum output capability message CML in response to the charging specification message BCP (SQ7), the vehicle 1 transmits a first charging preparation completion message BRO (0x00) to the charger 8 in response to the maximum output capability message CML (SQ8). Then, even though the detailed description thereof will not be repeated, processes after SQ9 proceeds similarly to the description in the standard communication sequence.

Figure 7:
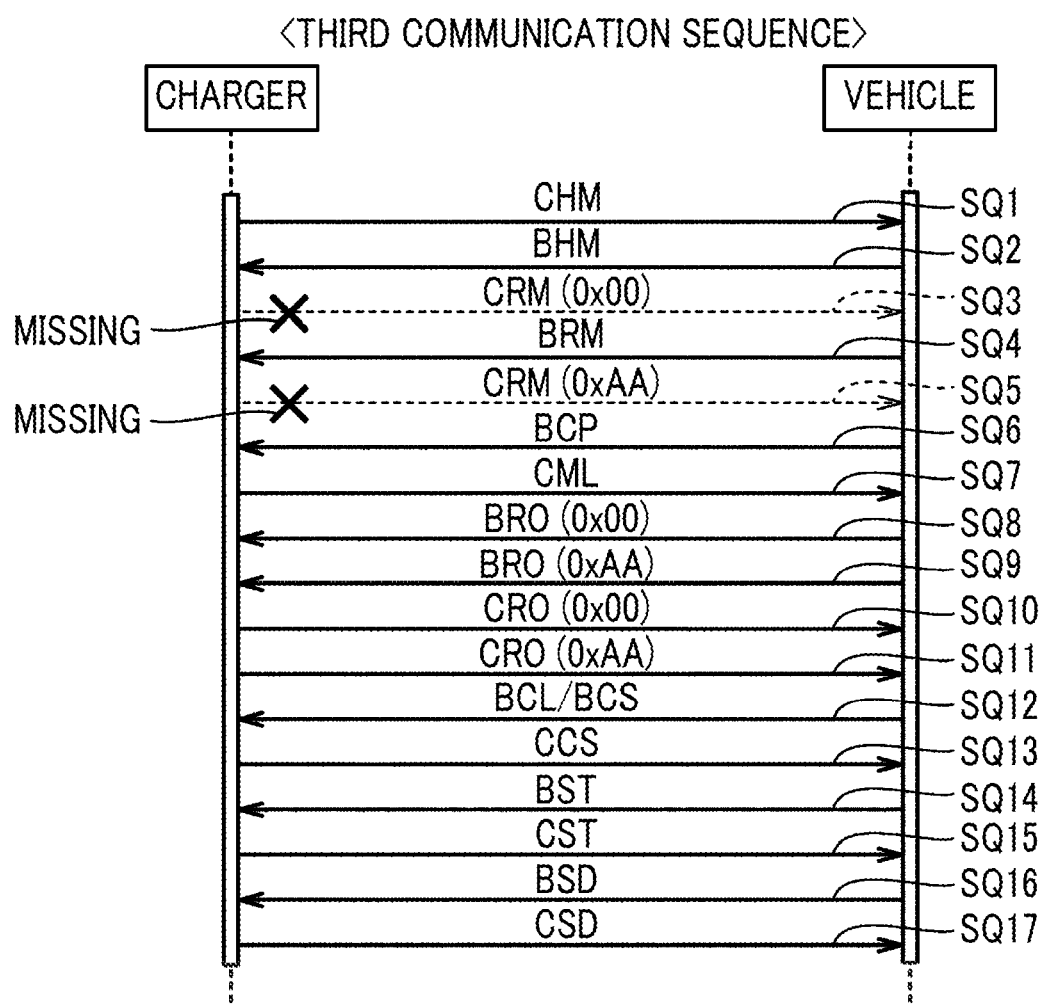
FIG. 7 is a sequence diagram showing a third communication sequence of the external charging control in the first embodiment.

FIG. 7 is a sequence diagram showing a third communication sequence of the external charging control in the first embodiment. Referring to FIG. 7, processes of SQ1 and SQ2 in the third communication sequence are the same as corresponding processes in the standard communication sequence (see FIG. 3).

In the third communication sequence, the first charger identification message CRM (0x00) from the charger 8 is missing. Even when the vehicle 1 does not receive the first charger identification message CRM (0x00) from the charger 8, the vehicle 1 transmits the vehicle identification message BRM to the charger 8 (SQ4) at the time when a defined time has elapsed from the time when the vehicle handshake message BHM is transmitted (SQ2). The charger 8 does not respond to the vehicle identification message BRM, and the second charger identification message CRM (0xAA) from the charger 8 is also missing. Even so, the vehicle 1 transmits the charging specification message BCP to the charger 8 (SQ6) at the time when a defined time has elapsed from the time when the vehicle identification message BRM is transmitted (SQ4).

Then, when the charger 8 transmits the maximum output capability message CML in response to the charging specification message BCP (SQ7), processes after SQ8 proceeds similarly to the second communication sequence.

As described above, in the first to third communication sequences, when the message from the charger 8, which is to confirm whether or not the communication link between the vehicle 1 and the charger 8 is established, is missing, the message defined next to the missing message is transmitted from the vehicle 1 to the charger 8. Meanwhile, when the charger 8 responds to the message, the vehicle determines that establishment of the communication link is confirmed, and executes a subsequent sequence process. In this way, when charger 8 does not comply with the communication sequence defined in the new standard, a situation can be avoided in which subsequent process is interrupted and external charging control is stopped due to one (or twice) failure in message exchange for confirming communication link establishment. As a result, when the charger 8 can proceed with the process in compliance with the communication sequence defined in the new standard, the battery 14 can be charged by starting supplying the electrical power from the charger 8 to the vehicle 1.

In addition, in the first communication sequence, the first charger identification message CRM (0x00) is one example of the "first signal" according to the disclosure, the vehicle identification message BRM is one example of the "second signal" according to the disclosure, and the second charger identification message CRM (0xAA) is one example of the "third signal" according to the disclosure. In the second and third communication sequences, the second charger identification message CRM (0xAA) is one example of the "first signal" according to the disclosure, the charging specification message BCP is one example of the "second signal" according to the disclosure, and the maximum output capability message CML is one example of the "third signal" according to the disclosure.

In the first to third communication sequence (see FIGS. 5 to 7), when the message from the charger 8, which is to establish the communication link, is missing, the description of proceeding forward with the process and then waiting for the subsequent message from the charger 8 has been made. The process as described above is applicable to message exchange after the communication establishment.

Figure 8:
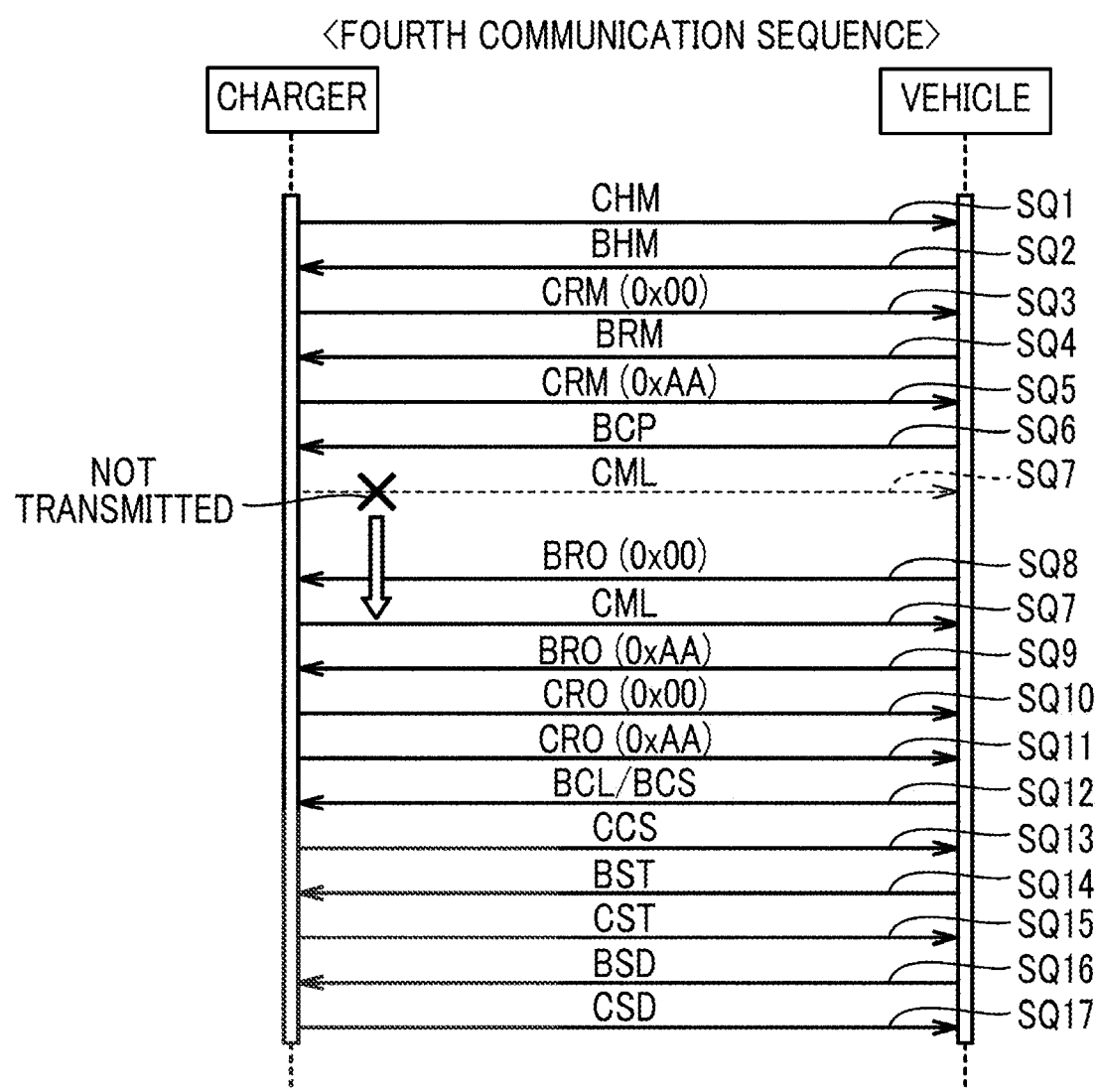
FIG. 8 is a sequence diagram showing a fourth communication sequence of the external charging control in the first embodiment.

FIG. 8 is a sequence diagram showing a fourth communication sequence of the external charging control in the first embodiment. Referring to FIG. 8, processes of SQ1 to SQ6 in the fourth communication sequence are the same as corresponding processes in the standard communication sequence (see FIG. 3).

In the fourth communication sequence, the charging specification message BCP is transmitted from the vehicle 1 to the charger 8 in SQ6. However, the charger 8 does not transmit the maximum output capability message CML to the vehicle 1 at the timing defined in the communication sequence of the new standard. Although the vehicle 1 does not receive the maximum output capability message CML, the vehicle 1 transmits the first charging preparation completion message BRO (0x00) to the charger 8 (SQ8). In this case, the maximum output capability message CML is transmitted to the charger 8 after the first charging preparation completion message BRO (0x00) is transmitted (SQ7). When the vehicle 1 receives the maximum output capability message CML, the vehicle 1 transmits a second charging preparation completion message BRO (0xAA) to the charger 8 (SQ9). Then, similarly to the first to third communication sequences, processes after SQ10 proceeds.

As described above, in the fourth communication sequence, when the maximum output capability message CML is not received from the charger 8 at the defined timing, the vehicle 1 transmits one (the first charging preparation completion message BRO (0x00)) of the two charging preparation completion messages to the charger 8, and waits for a response from the charger 8 in response thereto. When the maximum output capability message CML is received from the charger 8, the vehicle 1 transmits the other (the second charging preparation completion message BRO (0xAA)) of the two charging preparation completion messages to the charger 8 even when the receiving order of the maximum output capability message CML is different than the order defined in the communication sequence, and continues a subsequent process.

The maximum output capability message CML includes information on the output capacity of the charger 8 (voltage and current that can be output from the charger 8). The information is indispensable for safely exchanging the electric power. For this reason, as in the flowchart shown below (see FIG. 12), when the vehicle 1 does not receive the maximum output capability message CML from the charger 8 even when it transmits the first charging preparation completion message BRO (0x00), the vehicle 1 does not transmit the second charging preparation completion message BRO (0xAA) to the charger 8. Then, the communication sequence reaches a time-out, the electric power is not supplied from the charger 8 to the vehicle, and the process stops.

As described above, according to the fourth communication sequence, even when the charger 8 does not comply with the communication sequence of the new standard, there is a strong possibility that the maximum output capability message CML could be received from the charger 8, as compared to the comparative example. In this way, even when the charger 8 transmits the maximum output capability message CML later in the order defined, it is possible to charge the battery 14 by supplying the electric power from the charger 8 to the vehicle 1. Meanwhile, when the charger 8 has yet to transmit the maximum output capability message CML, it is possible to ensure safety of electric power exchange by not supplying the electric power from the charger 8 to the vehicle 1.

In addition, in the fourth communication sequence, the maximum output capability message CML is one example of the "first signal" according to the disclosure, and the first charging preparation completion message BRO (0x00) is one example of the "second signal" according to the disclosure.

As shown in the following fifth to seventh communication sequences, even when the output preparation completion message for notification of whether the charger 8 is prepared for output (power supply) is missing or is not transmitted in the defined order, the vehicle 1 can cope with it.

Figure 9:
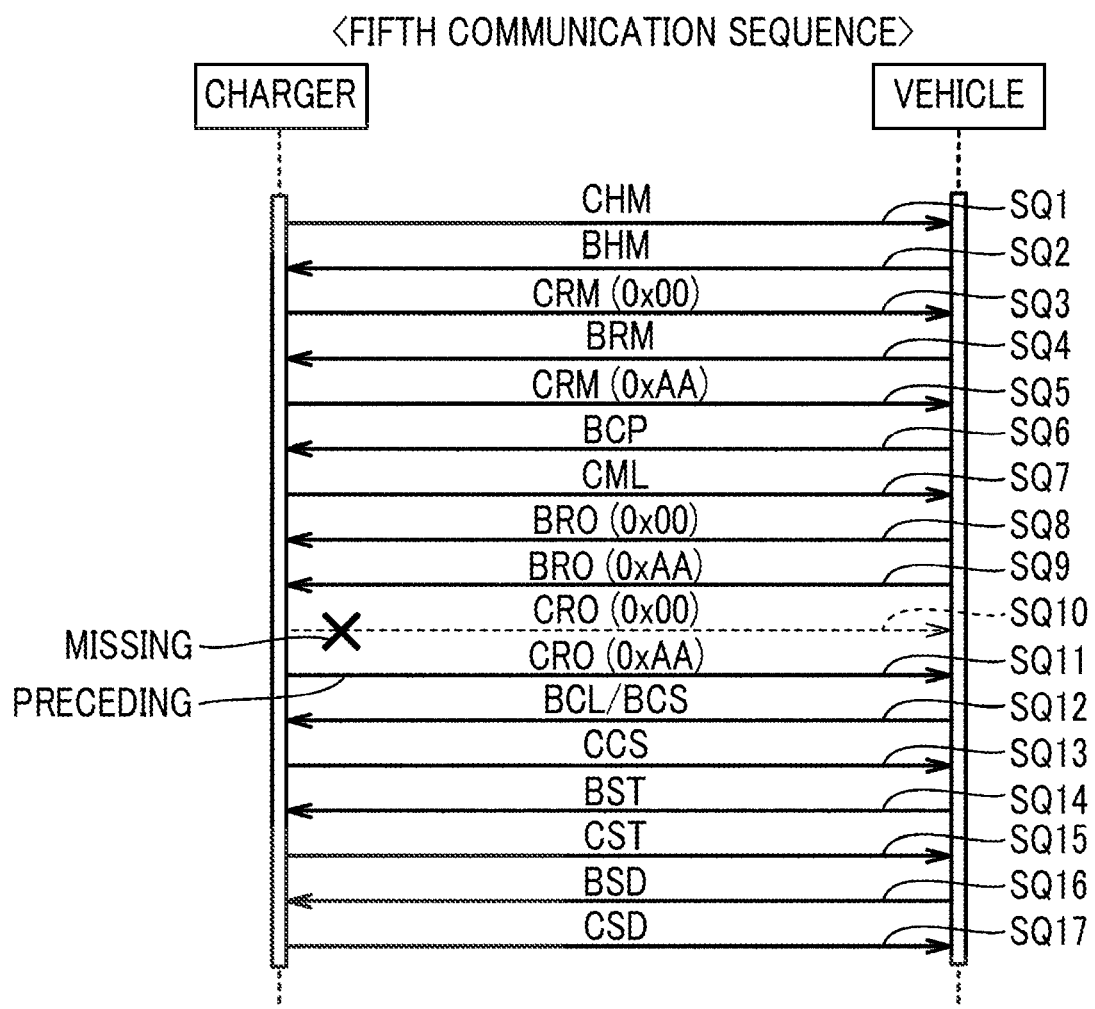
FIG. 9 is a sequence diagram showing a fifth communication sequence of the external charging control in the first embodiment.

FIG. 9 is a sequence diagram showing a fifth communication sequence of the external charging control in the first embodiment. Processes of SQ1 to SQ9 in the fifth communication sequence and sixth and seventh communication sequence to be described below are the same as corresponding processes in the standard communication sequence (see FIG. 3).

Referring to FIG. 9, in the fifth communication sequence, two charging preparation completion message (first charging preparation completion message BRO (0x00) and second charging preparation completion message BRO (0xAA)) are transmitted from the vehicle 1 to the charger 8 (SQ8, SQ9). Then, the charger 8 does not transmit the first output preparation completion message CRO (0x00) indicating that the output preparation of the charger 8 is not yet completed, and transmits a second output preparation completion message CRO (0xAA) indicating that the output preparation of the charger 8 is completed (SQ11). When the second output preparation completion message CRO (0xAA) is received, the vehicle 1 determines that the charger 8 has completed output preparation, and the process proceeds to the charging stage. Then, the vehicle 1 transmits a charging request message BCL and a battery charging state message BCS to the charger 8 (SQ12). Then, similarly to the standard communication sequence, processes after SQ13 proceeds.

In addition, in the fifth communication sequence, the first output preparation completion message CRO (0x00) is one example of the "first signal" according to the disclosure, and the charging request message BCL and the battery charging state message BCS are examples of the "second signal" according to the disclosure. Further, the second output preparation completion message CRO (0xAA) is one example of the "fourth signal" according to the disclosure.

Figure 10:
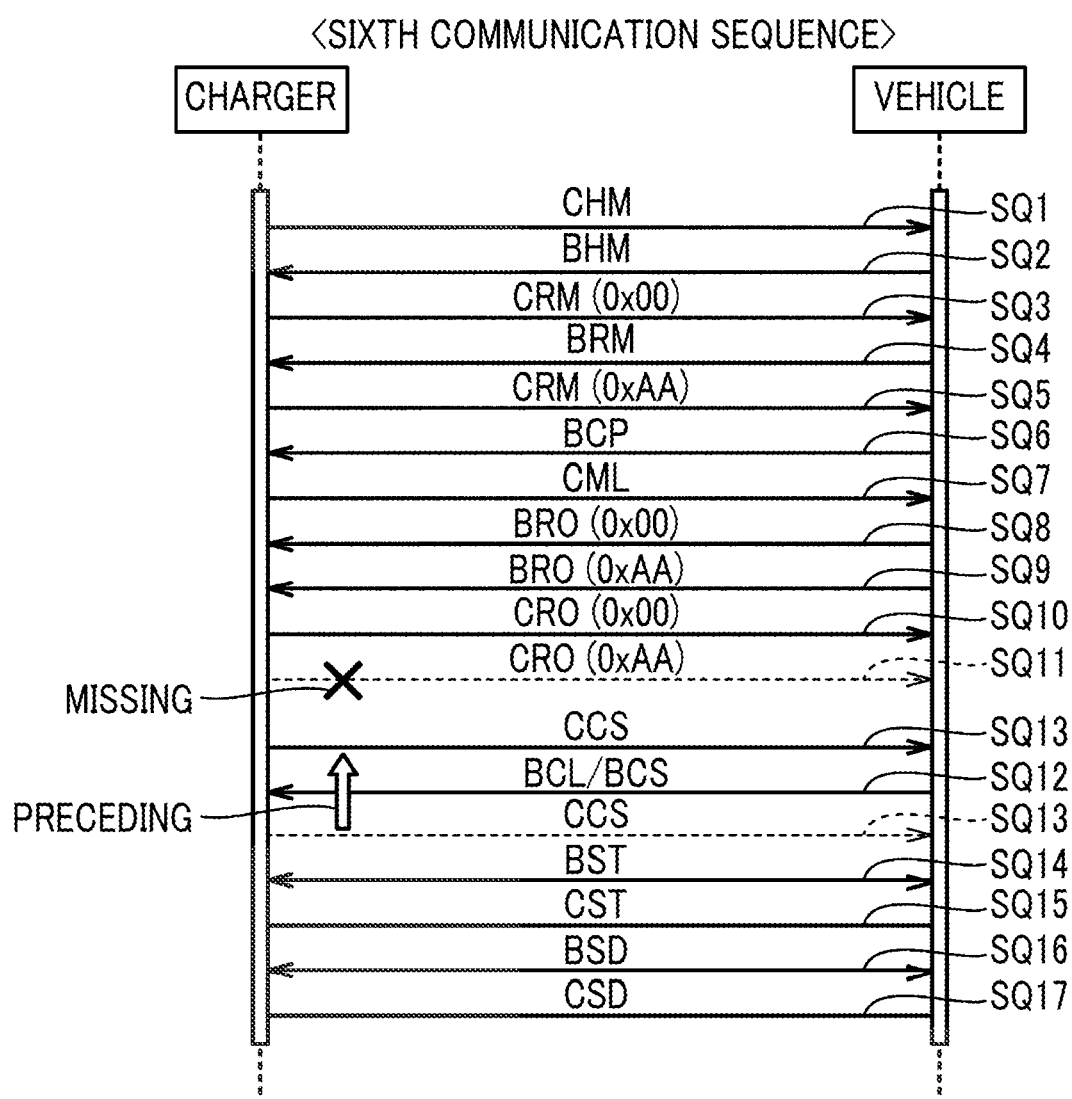
FIG. 10 is a sequence diagram showing a sixth communication sequence of the external charging control in the embodiment.

FIG. 10 is a sequence diagram showing a sixth communication sequence of the external charging control in the first embodiment. Referring to FIG. 10, in the sixth communication sequence, the charger 8 transmits the first output preparation completion message CRO (0x00) to the vehicle 1 (SQ10). However, the charger 8 does not transmit the second output preparation completion message CRO (0xAA), and transmits, to the vehicle 1, a charger charging state message CCS indicating information regarding an output voltage and an output current of the charger 8 (SQ13). The vehicle 1 receiving the charger charging state message CCS determines that the charger 8 has completed output preparation, and transmits the charging request message BCL and the battery charging state message BCS to the charger 8 (SQ12). Thereby, the power supply from the charger 8 to the vehicle 1 is started.

Figure 11:
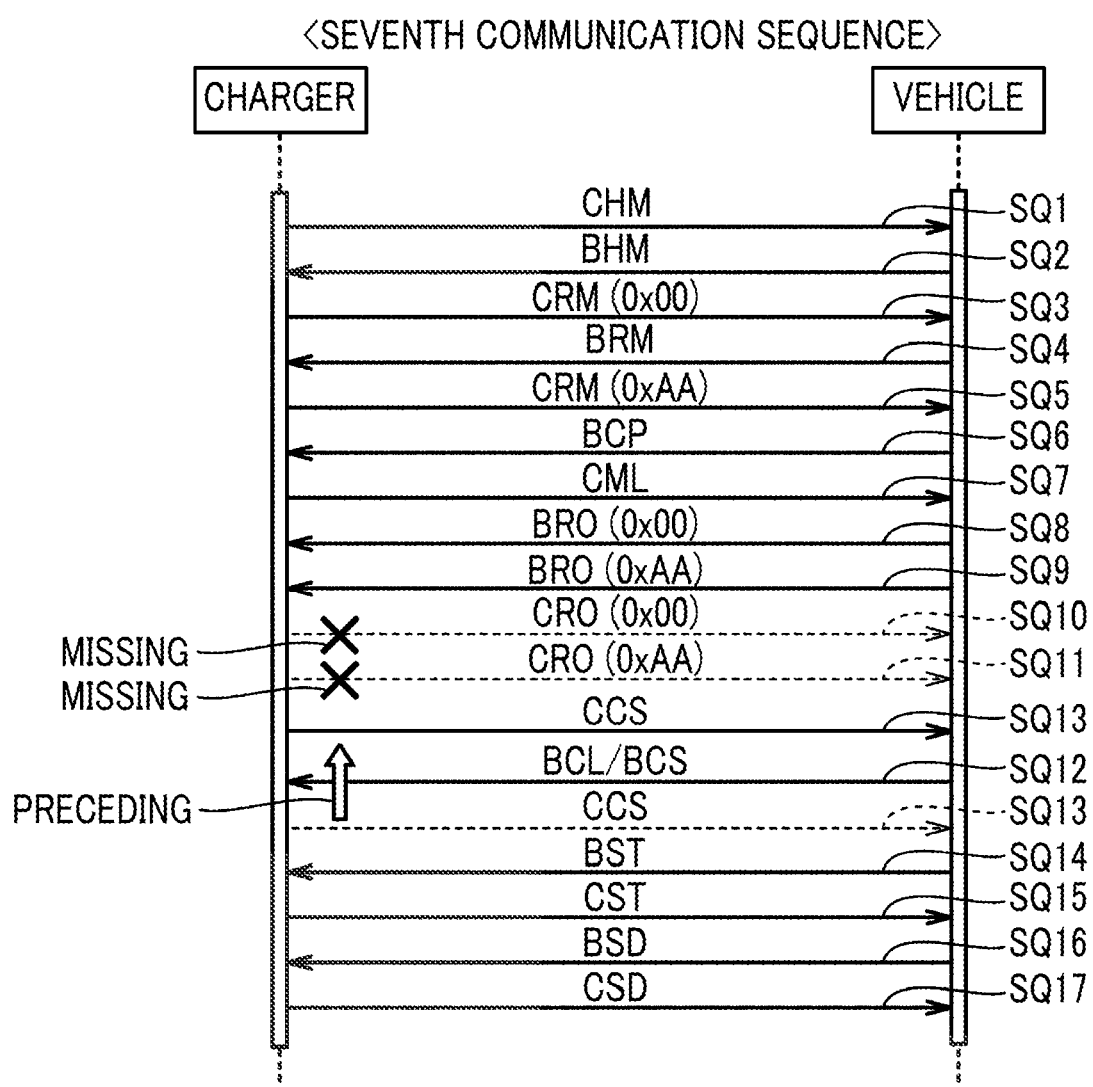
FIG. 11 is a sequence diagram showing a seventh communication sequence of the external charging control in the first embodiment.

FIG. 11 is a sequence diagram showing a seventh communication sequence of the external charging control in the first embodiment. Referring to FIG. 11, in the seventh communication sequence, neither of two output preparation completion message (first output preparation completion message CRO (0x00) and second output preparation completion message CRO (0xAA)) are not all transmitted from the vehicle 1 to the charger 8, and the charger charging state message CCS is transmitted (SQ13). Then, the vehicle 1 determines that the charger 8 has completed output preparation, and transmits the charging request message BCL and the battery charging state message BCS to the charger 8 (SQ12). Thereby, the power supply from the charger 8 to the vehicle 1 is started.

As described above, according to the fifth to seventh communication sequence, even when one or both of the two output preparation completion messages (first output preparation completion message CRO (0x00) and second output preparation completion message CRO (0xAA)) are missing, the vehicle 1 assumes that the charger 8 has completed output preparation and proceeds with subsequent processes when the vehicle 1 receives a signal to be transmitted after the missing signal earlier. In this way, it is possible to start power supply from the charger 8 to the vehicle 1, and charge the battery 14.

In addition, in the sixth and seventh communication sequence, the first output preparation completion message CRO (0xAA) is one example of the "first signal" according to the disclosure, and the charging request message BCL and the battery charging state message BCS are examples of the "second signal" according to the disclosure. In addition, the charger charging state message CCS is an example of "another signal" according to the disclosure.

Figure 12:
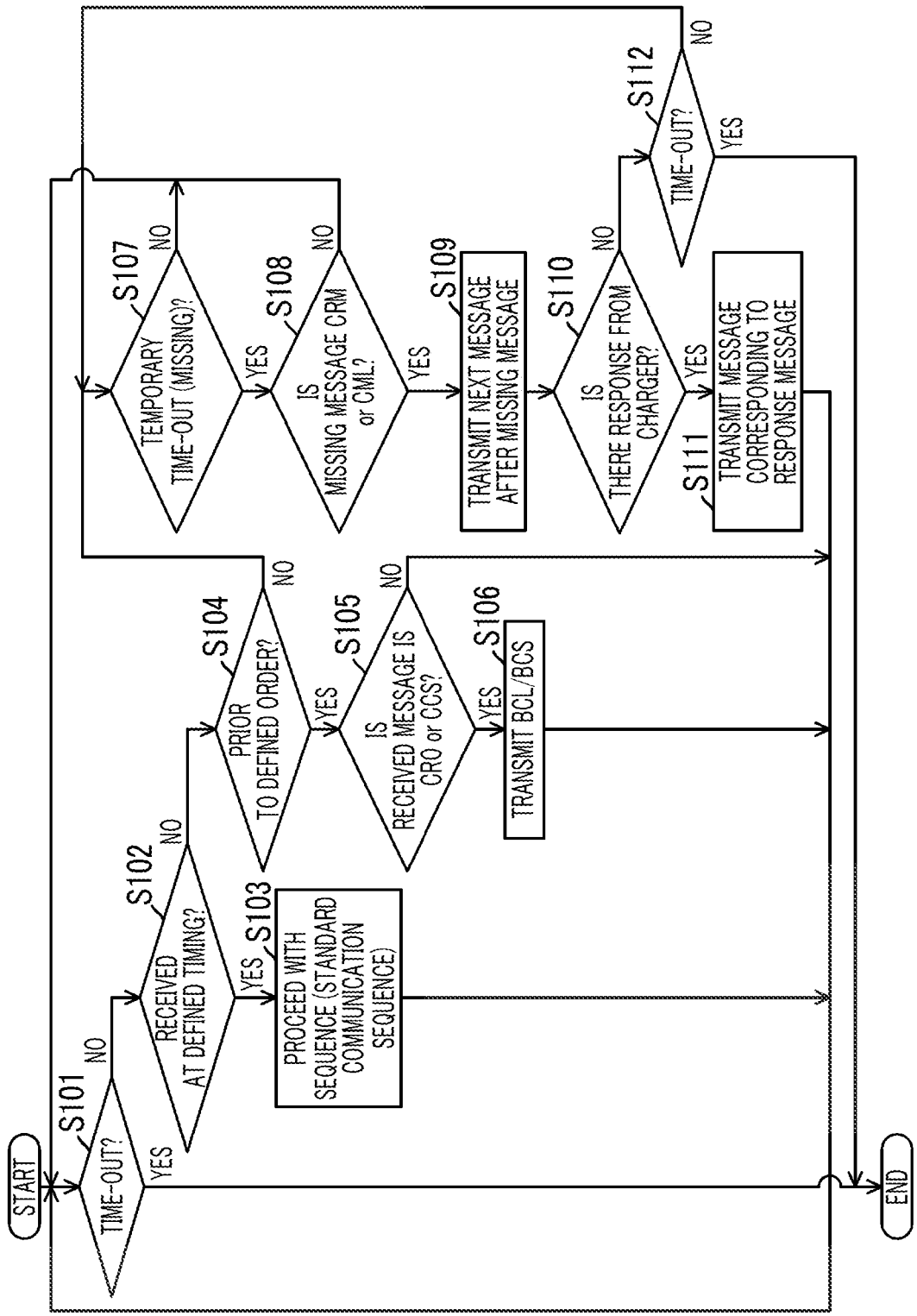
FIG. 12 is a flowchart showing the whole communication sequence of the external charging control in the first embodiment.

FIG. 12 is a flowchart showing the whole communication sequence of the external charging control in the first embodiment. This flowchart is executed when low voltage power supply is supplied in a state where the vehicle 1 and the charger 8 (which may be the charger 2) are connected by the charging cable 3 and the CAN communication or the like becomes possible between the vehicle 1 and the charger 8. Each step (hereinafter step is abbreviated as S) is realized by a software process by the ECU 10, but may be realized by hardware (electric circuit) manufactured in the ECU 10.

Referring to FIG. 12, in S101, the ECU 10 determines whether or not the communication sequence of the external charging control reaches a time-out. In other words, the ECU 10 determines whether or not the time that has elapsed from the start of the flow reaches a predetermined time-out time (for example, tens of seconds). When the communication sequence reaches the time-out (YES in S101), the external charging control cannot be performed due to abnormality, and the process ends.

When the external charging control does not reach the time-out (NO in S101), the ECU 10 determines whether or not the message is received from the charger 8 at the timing defined in the communication sequence of the new standard (S102). When the message is received at the defined timing (within the defined time and accurately according to the defined order) (YES in S102), the ECU 10 executes the next process defined in the communication sequence in response to the message (S103), and then causes the process to return back to S101. The process proceeding with S101 (determining NO), S102 (determining YES), and S103 is a normal process proceeding along the standard communication sequence (see FIG. 3).

On the other hand, when the message from the charger 8 is not received at the timing defined in the new standard (NO in S102), that is, when the message from the charger 8 is missing, or when the order of the message from the charger 8 is not in the order defined in the communication sequence of the new standard, the ECU 10 determines whether the message from the charger 8 has been received prior to the defined order (S104).

When the message from the charger 8 is received prior to the defined order (YES in S104), the ECU 10 determines whether or not the received message is related to output preparation from the charger 8 (S105). Specifically, the ECU 10 determines whether the received message is the second output preparation completion message CRO (0xAA) or the charger charging state message CCS.

When the received message is the second output preparation completion message CRO (0xAA) or the charger charging state message CCS (YES in S105), the ECU 10 transmits the charging request message BCL and the battery charging state message BCS to the charger 8 (S106). Then, the process returns to S101. In this case, when the charger charging state message CCS is transmitted from the charger 8 in response to the charging request message BCL and the battery charging state message BCS, determination result is YES in S102, and the process proceeds to S103. On the other hand, when the received message is neither the second output preparation completion message CRO (0xAA) nor the charger charging state message CCS (NO in S105), the process returns to S101 without executing the process of S106.

The process proceeding with S101 (determining NO), S102 (determining YES), S104 (determining NO), S105 (determining YES) and S106 is the process shown in the fifth to seventh communication sequences (see FIGS. 9 to 11). On the other hand, the processes of S107 to S112 described below are the processes shown in the first to fourth communication sequences (see FIGS. 5 to 8).

When the message from the charger 8 is not received prior to the defined order (NO in S104), the ECU 10 causes the process to proceed to S107, and determines whether or not the communication sequence of the external charging control reaches a temporary time-out. The temporary time-out is used for determining whether or not the message from the charger 8 is missing, and established at a time when a predetermined time elapses since the previous message has been received from the charger 8. The temporary time-out time is shorter than the time-out time in S101, and may be set to, for example, approximately several seconds to several tens of seconds. Until any message is received from the charger 8, the process of S107 (determining NO), S101 (determining NO), S102 (determining NO), and S104 (determining NO) are repeated. When the temporary time-out time has elapsed without receiving any message (YES in S107), the ECU 10 determines that a message that would have been transmitted from the charger 8 is missing, and causes the process to proceed to S108.

When the message from the charger 8 is missing, the ECU 10 may not proceed forward with the process no matter what the missing message is. Only when the missing message is not essential for the external charging control, the ECU 10 proceeds forward with the process of the communication sequence. In S108, the ECU 10 determines whether the missing message is the message described in the first to fourth communication sequences. Specifically, determination is made whether the missing message is the first charger identification message CRM (0x00), the second charger identification message CRM (0xAA), or the maximum output capability message CML.

When the missing message is not the message described in the first to fourth communication sequences (NO in S108), the process returns to S101. Then, while the processes of S101 (determining NO), S102 (determining NO), S104 (determining NO), S107 (determining YES) and S108 (determining NO) are repeated, the timeout time elapses (YES in S101), and the process ends.

When the missing message is the message described in the first to fourth communication sequences (YES in S108), the ECU 10 proceeds with the processing of the communication sequence, and the next message after the missing message defined in the communication sequence of the new standard is transmitted to the charger 8 (S109).

If the determination result is NO in S112 to be described later, the process proceeds to S109 again. Then, although there is no problem in the third communication sequence, the next message after the missing message is transmitted again in the first or second communication sequence or the like. Therefore, when the next message has already been transmitted, the message is not transmitted again in S109.

In S110, the ECU 10 determines whether or not the charger 8 has responded to the message transmitted from the vehicle 1 in S109 within a predetermined time. When the charger 8 does not respond within the predetermined time (NO in S110), the ECU 10 determines whether or not a timeout has been established (S112). As in the process of S101, the process is a process for determining whether or not the time that has elapsed from the start of the flow reaches a time-out time (for example, tens of seconds). If the time-out is established without the response from the charger 8 (YES in S112), the ECU 10 ends the process on the ground that the external charging control has not been executed normally.

On the other hand, when the charger 8 responds within the predetermined time (YES in S110), the ECU 10 proceeds forward with the process of the communication sequence (S111). The ECU 10 transmits, to the charger 8, a message corresponding to the response message from the charger 8. Then, the process returns to S101.

The correspondence relationship between the processes of S107 to S112 and the first to fourth communication sequences will be described in more detail. In the first communication sequence (see FIG. 5), the first charger identification message CRM (0x00) from the charger 8 is missing (YES in S107 and YES in S108). Then, the process proceeds to transmission of the vehicle identification message BRM (S109), and when charger 8 returns second charger identification message CRM (0xAA) in response to the vehicle identification message BRM (YES in S110), the charging specification message BCP from the vehicle 1 is transmitted (S111).

In the second communication sequence (see FIG. 6), the second charger identification message CRM (0xAA) from the charger 8 is missing (YES in S107 and YES in S108). Then, the process proceeds to transmission of charging specification message BCP (S109), and when the charger 8 returns maximum output capability message CML in response to charging specification message BCP (YES in S110), the charging preparation completion message BRO (0x00) from the vehicle 1 is transmitted (S111).

In the third communication sequence (see FIG. 7), both the first charger identification message CRM (0x00) and the second charger identification message CRM (0xAA) from the charger 8 are missing. First, when the first charger identification message CRM (0x00) is missing (YES in S107 and YES in S108), the ECU 10 transmits a vehicle identification message BRM to the charger 8 (S109). However, since the charger 8 does not respond to vehicle identification message BRM within a predetermined time (NO in S110 and NO in S112), the process returns to S107. Then, in this time, when the second charger identification message CRM (0xAA) is missing (YES in S107 and YES in S108), the ECU 10 transmits the charging specification message BCP to the charger 8 (S109). When the charger 8 returns the maximum output capability message CML in response to charging specification message BCP (YES in S110), the process proceeds to transmission of first charging preparation completion message BRO (0x00) (S111).

In the fourth communication sequence (see FIG. 8), the maximum output capability message CML from the charger 8 is transmitted later, but the transmission timing is different from the defined timing. For this reason, a temporary timeout is established on the ground that the maximum output capability message CML has not been received (YES in S107 and YES in S108), and the vehicle 1 transmits the first charging preparation completion message BRO (0x00) to the charger 8. (S109). When the charger 8 returns a maximum output capability message CML in response to the first charging preparation completion message BRO (0x00), which is different from the original process defined in the communication sequence of the new standard (YES in S110), the ECU 10 transmits, to the charger 8, the second charging preparation completion message BRO (0xAA) following the first charging preparation completion message BRO (0x00) (S111).

As described above, according to the first embodiment, even when the charger 8 is not completely compliant with the communication sequence of the new standard and the message from the charger 8 is missing, or even when a message different from the message to be transmitted is transmitted, the message defined after the message is transmitted from the vehicle 1 to the charger 8. It is likely that the charger 8 returns a message that is needed to the vehicle 1 by the transmission message from the vehicle 1 triggered when the vehicle 1 temporarily proceeds forward with the process defined in the communication sequence. When the charger 8 returns the message and the communication sequence between the vehicle 1 and the charger 8 returns to the standard communication sequence, it is possible to normally execute the communication sequence in the subsequent charging preparation stage and proceed to the charging stage. As a result, it is possible to charge the battery 14 by supplying electric power from the charger 8 to the vehicle 1.

In the first embodiment, the configuration of the vehicle 1 has been described when the transmission timing of the transmission message from the charger 8 to the vehicle 1 does not comply with the standard communication sequence. In the second embodiment, operations will be described when a transmission content from the charger 8 to the vehicle 1 does not comply with the standard communication sequence. The overall configuration of the vehicle according to the second embodiment is the same as the overall configuration of the vehicle 1 according to the first embodiment (see FIG. 2).

Figure 13:
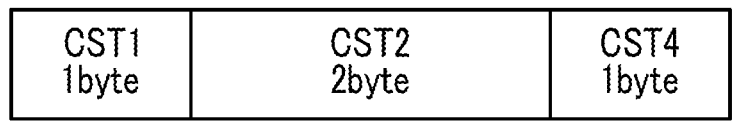
FIG. 13 is a diagram showing an example of a structure of a data field of a charging stop message.

FIG. 13 is a diagram showing an example of a structure (format) of a data field of the charging stop message CST. Referring to FIG. 13, the data field of the charging stop message CST (the content of the message) has, for example, a byte length of 4 bytes and represents the following contents.

The field of a first byte (indicated by CST1) of the charging stop message CST has a byte length of 1 byte and represents a cause of the charging stop by the charger (stop due to satisfaction of an end condition set in advance, stop by a user operation, stop due to charger failure, or the like). The field of a second byte (indicated by CST2) of the charging stop message CST has a byte length of 2 bytes and represents a failure cause of the charging stop by the charger (overheat failure of the charger, connector failure of the charger, or the like). The field of a fourth byte (indicated by CST4) of the charging stop message CST has a byte length of 1 byte and represents an error cause of the charging stop by the charger (current abnormality, voltage abnormality, or the like).

The content represented by each bit included in the field CST1 is defined in the communication sequence of the new standard. For example, the <00> that both a first bit and a second bit are 0 represents a normal charging stop. The <01> that the first bit is 0 and the second bit is 1 represents a stop due to reaching of the charger side to a set condition. The <10> that the first bit is 1 and the second bit is 0 represents that the vehicle 1 or the charger 8 is in an unreliable state. On the other hand, the <11> that both the first bit and the second bit are 1 is not defined in the communication sequence. Similar definitions are made for other fields CST2 and CST4.

Figure 14:
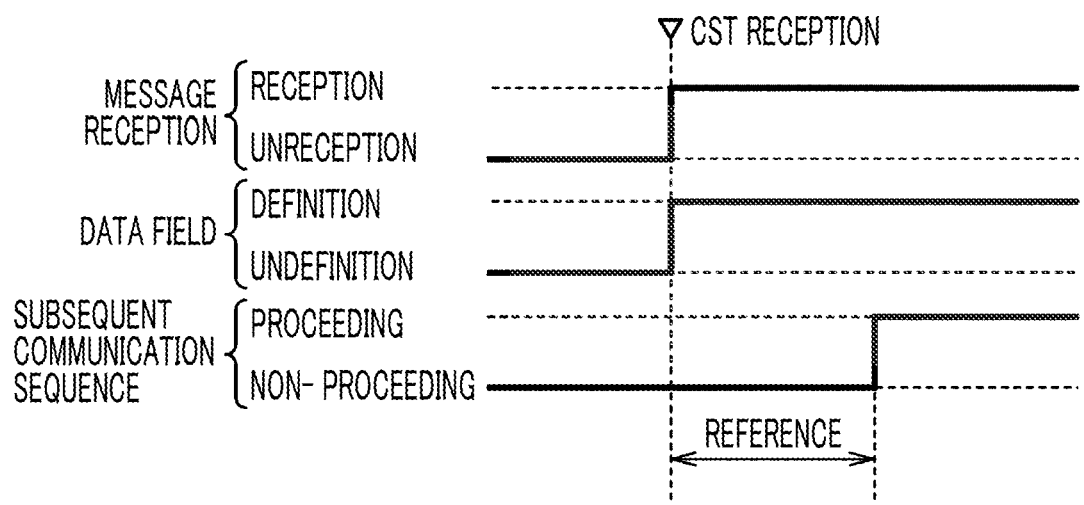
FIG. 14 is a conceptual diagram for describing a process when the charging stop message is received as defined in the communication sequence of the charging standard (new standard) of the quick charging (during normal reception)

FIG. 14 is a conceptual diagram for describing a process when the charging stop message CST is received as defined in the communication sequence of the charging standard (new standard) of the quick charging (during normal reception). Referring to FIG. 14, when the charging stop message CST is received, the vehicle 1 refers to the data field included in charging stop message CST. More specifically, the vehicle 1 analyzes whether or not the data field included in the charging stop message CST represents the content described in FIG. 13 (content defined in the communication sequence). The vehicle 1 determines whether or not to receive the charging stop message CST according to the analysis result. When the vehicle 1 determines to receive the charging stop message CST, the vehicle 1 returns an acknowledgement to the charger 2 and proceeds forward with the communication sequence to transmit a next message to the charger 2. However, the reply of the acknowledgement is not necessarily required in the disclosure.

Since the charging stop message CST transmitted from the normal charger 2 includes the data field representing the content as defined in the communication sequence, it is possible for the vehicle 1 to proceed with the communication sequence. However, the charger 8 that are not completely compliant (adapted) to the new standard may transmit a data field representing a content different from the content as defined in the communication sequence (in other words, data field representing an undefined content or not representing the defined content) to the vehicle 1 as shown in the following comparative example.

Figure 15:
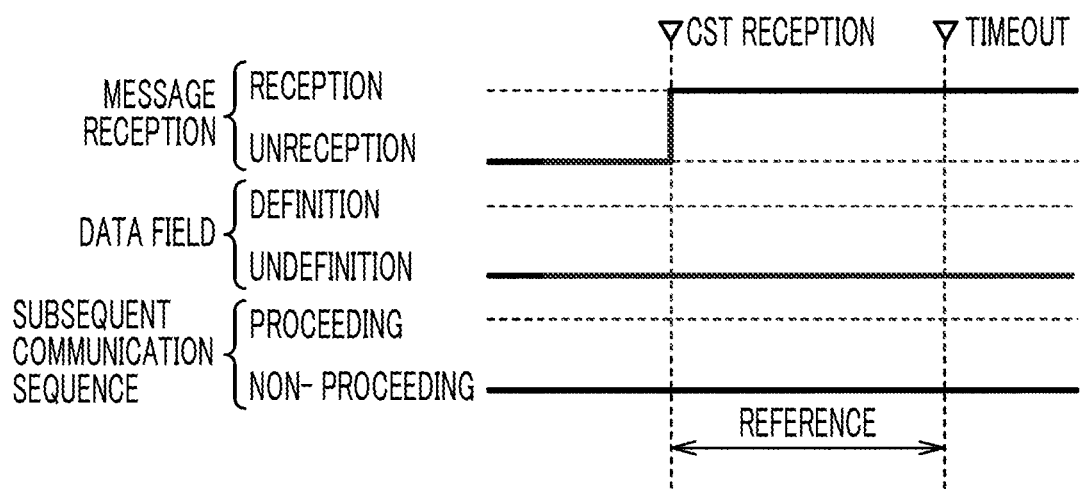
FIG. 15 is a conceptual diagram for describing a process at the time of receiving the charging stop message in the comparative example.

FIG. 15 is a conceptual diagram for describing a process at the time of receiving the charging stop message CST in the comparative example. Referring to FIG. 15, the charger 8 in the comparative example transmits a charging stop message CST including a data field representing a content different from the content defined in the communication sequence to the vehicle 9 in the comparative example. For example, in the example shown in FIG. 13, the charging stop message CST with both the first bit and the second bit set to 1 and including an undefined field CST1 is transmitted.

The vehicle 9 does not receive the charging stop message CST when the fact that the data field included in the charging stop message CST does not represent the content defined in the communication sequence becomes clear by referring to the content of the received charging stop message CST. In this case, unless another charging stop message CST as defined in the communication sequence is transmitted from the charger 8, the communication sequence cannot proceeds forward by the vehicle 1. As a result, a timeout process (described below) is reached, and the external charging control ends.

Figures 16, 17:
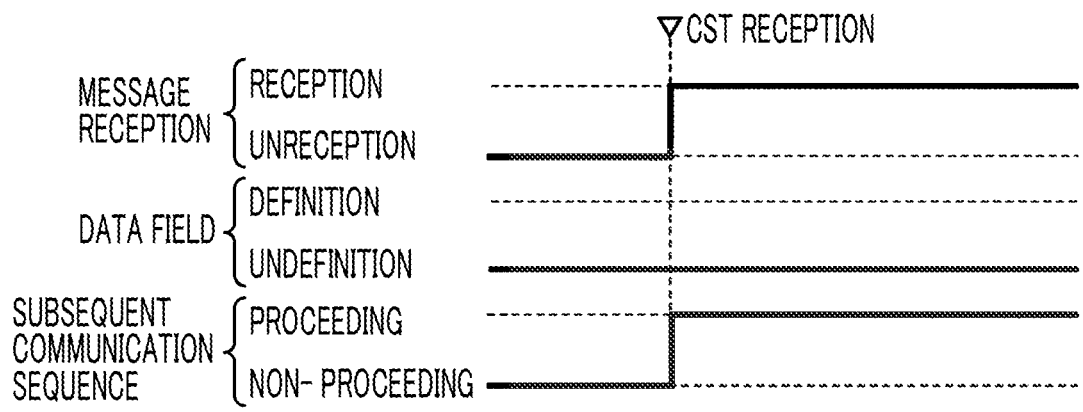
FIG. 16 is a conceptual diagram for describing the process at the time of receiving the charging stop message in a second embodiment.
FIG. 17 is a diagram that summarizes an outline of the process contents for each message.

FIG. 16 is a conceptual diagram for describing the process at the time of receiving the charging stop message CST in the second embodiment. Referring to FIG. 16, the charger 8 transmits a data field representing a content different from the content defined in the communication sequence to vehicle 1 also in the second embodiment similar to the comparative example.

In the second embodiment, the vehicle 1 does not refer to the content of the received charging stop message CST. That is, when the vehicle 1 knows that the received message is the charging stop message CST, the vehicle 1 receives the charging stop message CST without analyzing whether or not the data field included in the charging stop message CST represents the content defined in the communication sequence and proceed forward with the communication sequence. Accordingly, when the charger 8 which is a transmission source of the charging stop message CST does not comply with the communication sequence, it is possible to prevent the communication sequence from being stopped due to the data field of the charging stop message CST.

Although the charging stop message CST is described as an example in FIGS. 13 to 16, the same process can be executed for other messages. On the other hand, the same process is not desirable to be executed for all the messages.

FIG. 17 is a diagram that summarizes an outline of the process contents for each message. Referring to FIG. 17, the information such as the version number of the communication sequence included in the data field of the charger handshake message CHM is not necessarily required for the electric power supply. Further, the information relating to the output voltage and output current of the charger 8 included in the charger charging state message CCS is not necessarily required. Furthermore, the information included in the data field of the statistical data message CSD is for transmitting the information relating to the charging performance (the charging time and the amount of output electric power from the charger 8) at the charging end stage and is not necessarily required for the electric power supply. Therefore, when the vehicle 1 receives the message from the charger 8, the vehicle 1 can proceed with the subsequent processes of the communication sequence without referring to the data field (contents or content) of the message also for the charger handshake message CHM, the charger charging state message CCS, and the statistical data message CSD.

On the contrary, the vehicle 1 refers to the data field of the message and determines whether or not to proceed forward with the process of the communication sequence for the charger identification message CRM (the first charger identification message CRM (0x00) and the second charger identification message CRM (0xAA)), the maximum output capability message CML, and the output preparation completion message CRO (the first output preparation completion message CRO (0x00) and the second output preparation completion message CRO (0xAA)).

Figure 18:
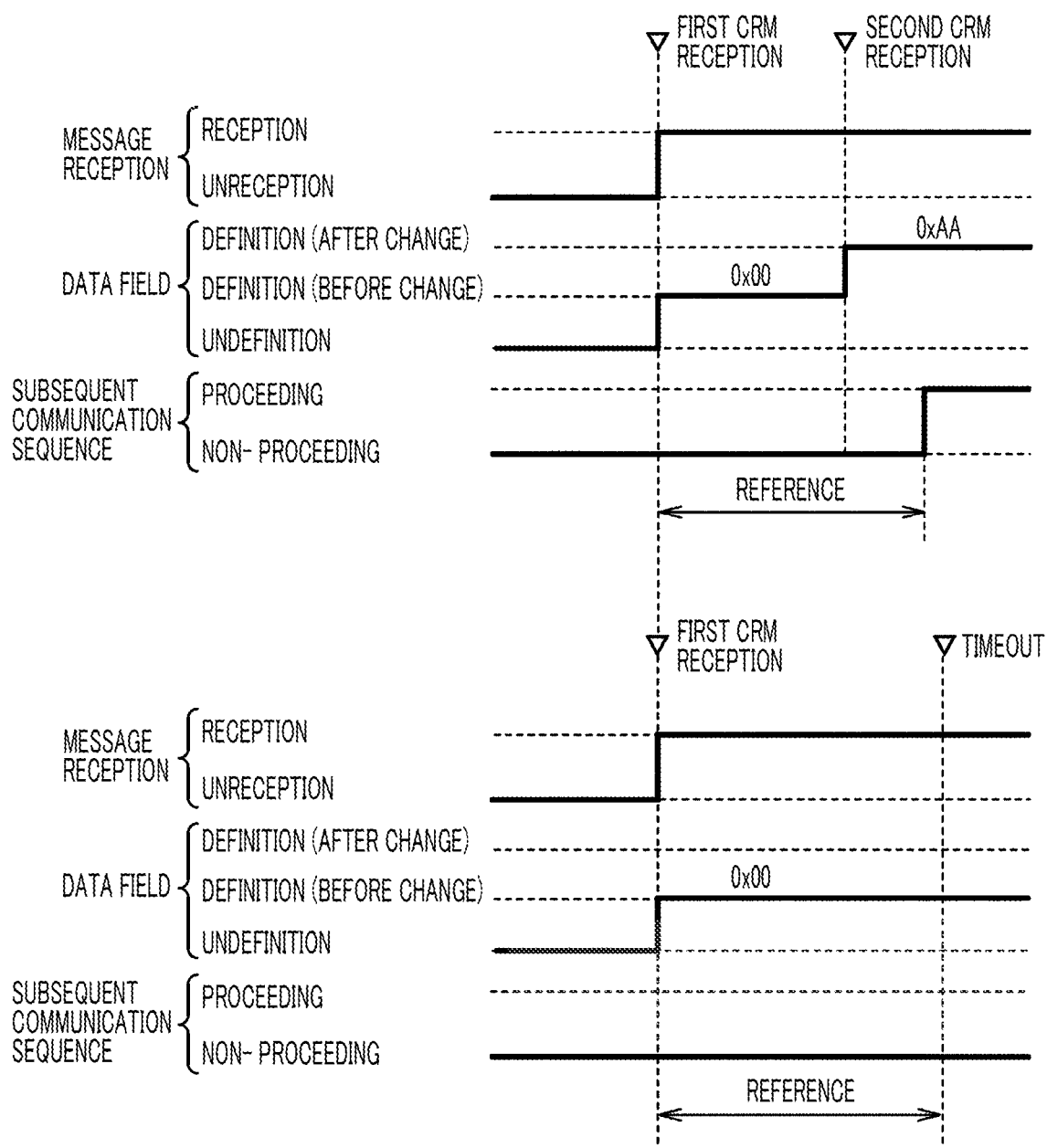
FIG. 18 is a conceptual diagram for describing a process at the time of receiving a charger identification message in the second embodiment.

FIG. 18 is a conceptual diagram for describing the process at the time of receiving the charger identification message CRM in the second embodiment. Referring to FIG. 18, when the vehicle 1 knows that the received message is the charger identification message CRM, the vehicle 1 also refers to the data field of charger identification message CRM in the embodiment. Specifically, the vehicle 1 first receives the first charger identification message CRM (0x00) indicating that the charger 8 does not yet identify the vehicle 1 from the charger 8. Thereafter, the data field of the message is changed by the charger 8, and the vehicle 1 receives the second charger identification message CRM (0xAA) indicating that the charger 8 already identifies the vehicle 1 from the charger 8. In this case, vehicle 1 proceeds forward with the communication sequence assuming that charger identification message CRM is received.

With the communication sequence described in FIG. 3, the vehicle 1 transmits the vehicle identification message BRM to the charger 8 in response to the first charger identification message CRM (0x00) (SQ4).

However, in the second embodiment, even when the vehicle 1 receives the second charger identification message CRM (0xAA) from the charger 8 without transmitting the vehicle identification message BRM to the charger 8, the communication sequence proceeds forward.

On the other hand, it is not desirable to proceed with the communication sequence while the fact that the charger 8 already identifies the vehicle 1 is confirmed by receiving the second charger identification message CRM (0xAA). Therefore, the vehicle 1 does not proceed forward with the communication sequence when the charger identification message CRM is not switched from the first charger identification message CRM (0x00) to the second charger identification message CRM (0xAA) and allows the timeout process to occur.

Although the charger identification message CRM is described as an example in FIG. 18, the same process is executed for the output preparation completion message CRO.

Figure 19:
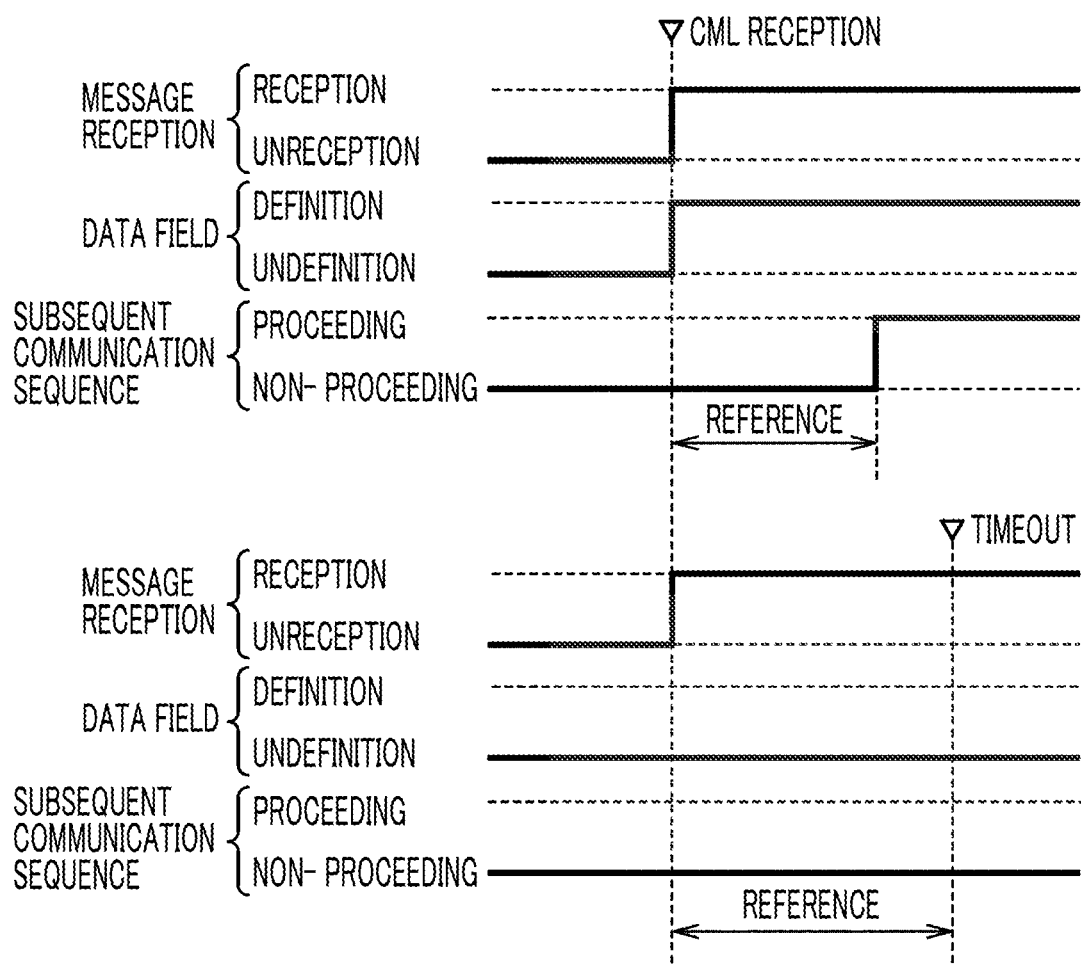
FIG. 19 is a conceptual diagram for describing a process at the time of receiving a maximum output capability message in the second embodiment.

FIG. 19 is a conceptual diagram for describing the process at the time of receiving the maximum output capability message CML according to the second embodiment. Referring to FIG. 19, when the vehicle 1 knows that the received message is the maximum output capability message CML, the vehicle 1 refers to the data field of the maximum output capability message CML. Specifically, the vehicle 1 analyzes whether or not the information for calculating the maximum electric power that can be output from the charger 8 included in the data field of the maximum output capability message CML is defined in the communication sequence.

The information included in the maximum output capability message CML is specifically the maximum output voltage and maximum output current and the minimum output voltage and minimum output current of the charger 8 and is indispensable to decide the charging condition for a safe electric power exchange between the vehicle 1 and the charger 8. Therefore, while the vehicle 1 proceeds forward with the communication sequence when the information included in the data field of the maximum output capability message CML received from the charger 8 is defined in the communication sequence, the vehicle 1 does not proceed forward with the communication sequence when the information is not defined in the communication sequence.

In the embodiment, the communication sequence proceeds without referring to the contents of all the four signals. However, the process may be executed only for any one to three of the four signals. That is, the process may be executed for at least one of the four signals.

Figure 20:
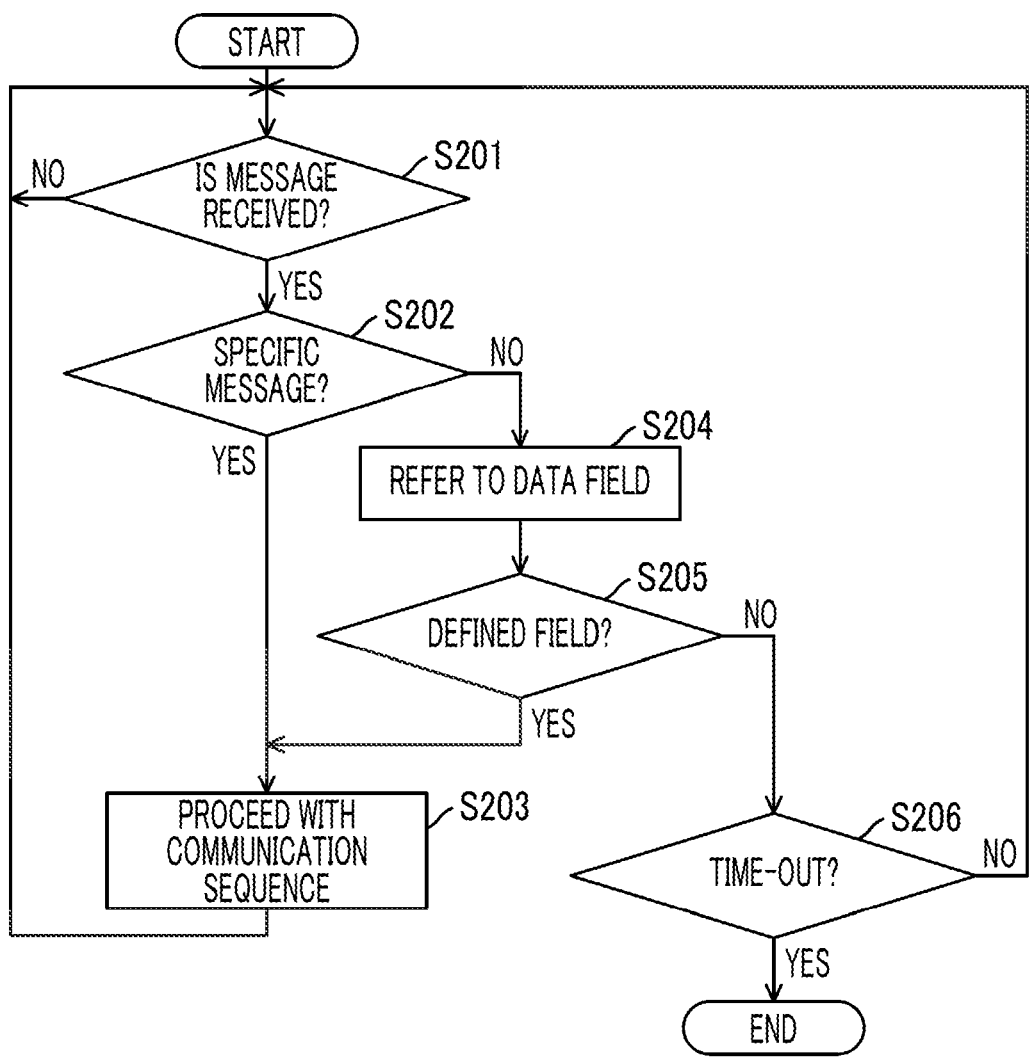
FIG. 20 is a flowchart showing the communication sequence of the external charging control in the second embodiment.

FIG. 20 is a flowchart showing the communication sequence of the external charging control in the second embodiment. Referring to FIG. 20, this flowchart is executed when low voltage power supply is supplied in a state where the vehicle 1 and the charger 8 (which may be the charger 2) are connected by the charging cable 3 and the CAN communication or the like becomes possible between the vehicle 1 and the charger 8. Each step is realized by a software process by the ECU 10, but may be realized by hardware (an electric circuit) manufactured in the ECU 10.

Referring to FIG. 20, the ECU 10 determines whether or not a message is received from charger 8 in S201. When the message is received (YES in S201), the ECU 10 determines whether or not the message is a specific message (S202).

When the received message is the specific message, that is, any one of the charging stop message CST, the charger handshake message CHM, the charger charging state message CCS, and the statistical data message CSD (YES in S202), the ECU 10 proceeds with the communication sequence without referring to the data field assuming that the information included in the data field of the message is not necessarily required (S203). Thereafter, the process returns to S201.

On the contrary, when the received message is another message other than the specific message, that is, any one of the charger identification message CRM, the maximum output capability message CML, and the output preparation completion message CRO (NO in S202), the ECU 10 refers to the data field for acquiring the information included in the data field of the message (S204). The ECU 10 analyzes whether or not the data field represents the content defined in the communication sequence (S205). Whether or not the content of the data field is the defined content is described in detail with reference to FIG. 18 or FIG. 19, and thus the detailed description thereof will not be repeated.

When the data field of the received message represents the content defined in the communication sequence (YES in S205), the ECU 10 proceeds with the process to S203 and executes the subsequent communication sequence. On the contrary, when the data field of the received message does not represent the content defined in the communication sequence (NO in S205), the ECU 10 determines whether or not the external charging control reaches a timeout (S206).

When an elapsed time from the start of the flow shown in FIG. 20 reaches a predetermined timeout time (for example, several tens of seconds) (YES in S206), the ECU 10 ends the process assuming that the external charging control cannot be executed normally. When the external charging control does not reach the timeout (NO in S206), the process returns to S201.

As described above, according to the second embodiment, the vehicle 1 proceeds forward with the communication sequence regardless of the data field (message content or contents) of the message for the specific messages (CHM, CCS, CST, and CSD) in which the data field does not represent the contents required for the electric power exchange. Accordingly, it is possible to suppress interruption of the communication sequence due to an error in the data field even when the charger 8 side is not completely compliant with the communication sequence of the new standard. On the other hand, the vehicle 1 refers to the data field of the message and determines whether or not to proceed forward with the communication sequence for other messages (CRM, CML, and CRO) in which the data field represents the contents required for the electric power exchange. Accordingly, it is possible to confirm the establishment of the communication link (CRM) and to ensure the safety of the electric power exchange (CML, CRO).

The disclosed embodiment is to be considered as illustrative in all points and not restrictive. The scope of the disclosure is indicated by the scope of claims instead of the above description of the embodiment and is intended to include all modifications within the meaning and scope equivalent to the scope of claims.

What is claimed is:

1. A control device for a vehicle, the vehicle including an electric power storage device and configured to charge the electric power storage device with an electric power supplied from a charger provided outside the vehicle, the control device comprising:
    an input and output circuit configured to input a predetermined signal and to output the predetermined signal, the predetermined signal being a signal transmitted and received between the vehicle and the charger; and
    a control circuit configured to, prior to starting charging of the electric power storage device, prepare for charging of the electric power storage device by controlling transmission and reception of signals through the input and output circuit according to a predefined communication sequence, the predefined communication sequence being defined that a second signal is transmitted to the charger when the vehicle receives a first signal at a predetermined timing,
    the control circuit being configured to proceed with the predefined communication sequence by transmitting the second signal to the charger even when the vehicle does not receive the first signal after the second signal is transmitted.

2. The control device according to claim 1, wherein:
the first signal is a signal that establishes a communication link between the vehicle and the charger; and
the control circuit is configured to transmit the second signal when the first signal is not received even after a time defined in the predefined communication sequence has elapsed.

3. The control device according to claim 2, wherein:
the predefined communication sequence is further defined such that the vehicle receives a third signal transmitted in response to the second signal from the charger;
the control circuit is configured to further proceed with the predefined communication sequence when the vehicle receives the third signal after the second signal is transmitted; and
the control circuit is configured to stop proceeding with the predefined communication sequence when the vehicle does not receive the third signal after the second signal is transmitted.

4. The control device according to claim 1, wherein:
the first signal is a signal for notification of the electric power suppliable from the charger; and
the control circuit is configured to transmit the second signal when the vehicle has not received the first signal even after a time defined in the predefined communication sequence has elapsed.

5. The control device according to claim 4, wherein:
the second signal is a signal for notification of a preparation state of charging of the vehicle;
the control circuit is configured to further proceed with the predefined communication sequence when the vehicle receives the first signal after the second signal is transmitted; and
the control circuit is configured to stop proceeding with the predefined communication sequence when the vehicle does not receive the first signal after the second signal is transmitted.

6. The control device according to claim 1, wherein:
the first signal is a signal for notification that a preparation of electric power supply of the charger is not completed;
the control circuit is configured to transmit the second signal when the vehicle receives another signal that does not follow an order defined in the predefined communication sequence, instead of receiving the first signal; and
the other signal is a signal for notification that the preparation of electric power supply of the charger is completed.

7. The control device according to claim 1, wherein:
the first signal is a signal for notification that preparation of electric power supply of the charger is completed;
the control circuit is configured to transmit the second signal when the vehicle receives another signal that does not follow an order defined in the predefined communication sequence, instead of receiving the first signal;
the second signal is a signal for notification of a requested voltage and a requested current of the vehicle; and
the other signal is a signal for notification of a supply voltage and a supply current of the charger.

8. A vehicle comprising:
an electric power storage device configured to charge with an electric power supplied from a charger provided outside the vehicle; and
a control device including an input and output circuit and a control circuit, wherein:
    the input and output circuit is configured to input a predetermined signal and to output the predetermined signal, the predetermined signal is a signal transmitted and received between the vehicle and the charger;
    the control circuit is configured to, prior to starting charging of the electric power storage device, prepare for charging of the electric power storage device by controlling transmission and reception of signals through the input and output circuit according to a predefined communication sequence, the predefined communication sequence is defined that a second signal is transmitted to the charger when the vehicle receives a first signal at a predetermined timing; and the control circuit is configured to proceed with the predefined communication sequence by transmitting the second signal to the charger even when the vehicle does not receive the first signal after the second signal is transmitted.

9. The vehicle according to claim 8, wherein:
the first signal is a signal that establishes a communication link between the vehicle and the charger; and
the control circuit is configured to transmit the second signal when the first signal is not received even after a time defined in the predefined communication sequence has elapsed.

10. The vehicle according to claim 9, wherein:
the predefined communication sequence is further defined such that the vehicle receives a third signal transmitted in response to the second signal from the charger;
the control circuit is configured to further proceed with the predefined communication sequence when the vehicle receives the third signal after the second signal is transmitted; and
the control circuit is configured to stop proceeding with the predefined communication sequence when the vehicle does not receive the third signal after the second signal is transmitted.

11. The vehicle according to claim 8, wherein:
the first signal is a signal for notification of the electric power suppliable from the charger; and
the control circuit is configured to transmit the second signal when the vehicle has not received the first signal even after a time defined in the predefined communication sequence has elapsed.

12. The vehicle according to claim 11, wherein:
the second signal is a signal for notification of a preparation state of charging of the vehicle;
the control circuit is configured to further proceed with the predefined communication sequence when the vehicle receives the first signal after the second signal is transmitted; and
the control circuit is configured to stop proceeding with the predefined communication sequence when the vehicle does not receive the first signal after the second signal is transmitted.

13. The vehicle according to claim 8, wherein:
the first signal is a signal for notification that a preparation of electric power supply of the charger is not completed;
the control circuit is configured to transmit the second signal when the vehicle receives another signal that does not follow an order defined in the predefined communication sequence, instead of receiving the first signal; and
the other signal is a signal for notification that the preparation of electric power supply of the charger is completed.

14. The vehicle according to claim 8, wherein:
the first signal is a signal for notification that preparation of electric power supply of the charger is completed;
the control circuit is configured to transmit the second signal when the vehicle receives another signal that does not follow an order defined in the predefined communication sequence, instead of receiving the first signal;
the second signal is a signal for notification of a requested voltage and a requested current of the vehicle; and
the other signal is a signal for notification of a supply voltage and a supply current of the charger.

15. A method of controlling a vehicle, the vehicle including an electric power storage device and a control device and configured to charge the electric power storage device with an electric power supplied from a charger provided outside of the vehicle, the control device configured to, prior to starting charging of the electric power storage device, prepare for charging of the electric power storage device by controlling transmission and reception of signals to and from the charger according to a predefined communication sequence, the predefined communication sequence being defined that a second signal is transmitted to the charger when the vehicle receives a first signal at a predetermined timing, the method comprising:
determining, by the control device, whether or not the first signal is received at the predetermined timing; and
proceeding, by the control device, with the predefined communication sequence by transmitting the second signal to the charger even when the first signal is not received after the second signal is transmitted.

16. The method according to claim 15, wherein:
the first signal is a signal that establishes a communication link between the vehicle and the charger; and
the method further comprises transmitting the second signal when the first signal is not received even after a time defined in the predefined communication sequence has elapsed.

17. The method according to claim 16, wherein:
the predefined communication sequence is further defined such that the vehicle receives a third signal transmitted in response to the second signal from the charger; and
the method further comprises:
proceeding with the predefined communication sequence when the vehicle receives the third signal after the second signal is transmitted; and
stopping the proceeding with the predefined communication sequence when the vehicle does not receive the third signal after the second signal is transmitted.

18. The method according to claim 15, wherein:
the first signal is a signal for notification of the electric power suppliable from the charger;
the second signal is a signal for notification of a preparation state of charging of the vehicle; and
the method further comprises:
transmitting the second signal when the vehicle has not received the first signal even after a time defined in the predefined communication sequence has elapsed;
proceeding with the predefined communication sequence when the vehicle receives the first signal after the second signal is transmitted; and
stopping the proceeding with the predefined communication sequence when the vehicle does not receive the first signal after the second signal is transmitted.

19. The method according to claim 15, wherein:
the first signal is a signal for notification that a preparation of electric power supply of the charger is not completed; and
the method further comprising transmitting the second signal when the vehicle receives another signal that does not follow an order defined in the predefined communication sequence, instead of receiving the first signal, the other signal is a signal for notification that the preparation of electric power supply of the charger is completed.

20. The method according to claim 15, wherein:

the first signal is a signal for notification that preparation of electric power supply of the charger is completed; and the method further comprises transmitting the second signal when the vehicle receives another signal that does not follow an order defined in the predefined communication sequence, instead of receiving the first signal, the second signal is a signal for notification of a requested voltage and a requested current of the vehicle, and the other signal is a signal for notification of a supply voltage and a supply current of the charger.

* * * * *